US012241808B2

(12) United States Patent
Matsumoto et al.

(10) Patent No.: US 12,241,808 B2
(45) Date of Patent: Mar. 4, 2025

(54) TIRE TESTING DEVICE

(71) Applicant: KOKUSAI KEISOKUKI KABUSHIKI KAISHA, Tokyo (JP)

(72) Inventors: Sigeru Matsumoto, Tokyo (JP); Hiroshi Miyashita, Tokyo (JP); Kazuhiro Murauchi, Tokyo (JP); Shuichi Tokita, Kanagawa (JP); Naonori Oishi, Kanagawa (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 17/718,589

(22) Filed: Apr. 12, 2022

(65) Prior Publication Data

US 2022/0244143 A1   Aug. 4, 2022

Related U.S. Application Data

(63) Continuation-in-part of application No. PCT/JP2020/040018, filed on Oct. 23, 2020.

(30) Foreign Application Priority Data

Oct. 25, 2019   (JP) ................. 2019-194640

(51) Int. Cl.
*G01M 17/02*   (2006.01)
*F16C 13/00*   (2006.01)
*F16C 29/00*   (2006.01)

(52) U.S. Cl.
CPC ......... *G01M 17/021* (2013.01); *F16C 13/006* (2013.01); *F16C 29/008* (2013.01)

(58) Field of Classification Search
CPC .... G01M 17/021; F16C 13/006; F16C 29/008
See application file for complete search history.

(56) References Cited

U.S. PATENT DOCUMENTS 3,345,865 A   10/1967 Ostrander
3,726,124 A   4/1973 Obarski
(Continued)

FOREIGN PATENT DOCUMENTS

CN   202851645 U   *   4/2013
CN   107367396 A       11/2017
(Continued)

OTHER PUBLICATIONS

Jul. 31, 2023 Office Action issued in Japanese Patent Application No. 2019-194640.
(Continued)

*Primary Examiner* — Jill E Culler
(74) *Attorney, Agent, or Firm* — Oliff PLC

(57) ABSTRACT

A tire testing device includes a road surface, a carriage capable of traveling along the road surface in a state where a test tire is in contact with the road surface, and a guide mechanism configured to guide movement of the carriage. The guide mechanism includes a rail, and a runner. The runner includes a first roller that rolls on an upper surface of a head of the rail, and a second roller that rolls on a lower surface or a side surface of the head of the rail. The tire testing device includes a first guide mechanism and a second guide mechanism. In the first guide mechanism, the rollers except for the first roller are disposed only on one side of the rail, and in the second guide mechanism, the rollers except for the first roller are disposed only on an other side of the rail.

9 Claims, 27 Drawing Sheets

(56) References Cited

U.S. PATENT DOCUMENTS

| | | | |
|---|---|---|---|
| 3,878,712 | A | 4/1975 | Chapin |
| 3,948,095 | A | 4/1976 | Burgett et al. |
| 4,344,324 | A | 8/1982 | Langer |
| 4,458,527 | A | 7/1984 | McFarland et al. |
| 4,848,143 | A | 7/1989 | Ushikoshi |
| 4,936,138 | A | 6/1990 | Cushman et al. |
| 4,958,512 | A | 9/1990 | Johnsen |
| 5,027,649 | A | 7/1991 | Himmler |
| 5,029,467 | A | 7/1991 | Cargould |
| 5,067,348 | A | 11/1991 | Himmler et al. |
| 5,111,687 | A | 5/1992 | Hill |
| 5,289,718 | A | 3/1994 | Mousseau |
| 5,317,912 | A | 6/1994 | Mallison |
| 5,481,907 | A | 1/1996 | Chasco et al. |
| 6,094,979 | A | 8/2000 | Haslett |
| 6,192,736 | B1 | 2/2001 | Clem |
| 6,578,275 | B1 | 6/2003 | Delmoro et al. |
| 7,509,847 | B2 | 3/2009 | Halliday |
| 7,552,630 | B2 | 6/2009 | Delmoro et al. |
| 7,908,916 | B2 | 3/2011 | Jenniges et al. |
| 7,908,917 | B2 | 3/2011 | Kitagawa et al. |
| 8,776,587 | B2 | 7/2014 | Sumitani et al. |
| 8,794,059 | B2 | 8/2014 | Wollbrinck et al. |
| 8,869,618 | B2 | 10/2014 | Wakao |
| 9,677,972 | B2 | 6/2017 | Symens et al. |
| 9,746,396 | B2 * | 8/2017 | Seimoto ............ B29D 30/0016 |
| 10,281,417 | B2 * | 5/2019 | Ueda ................. G01M 17/021 |
| 10,371,603 | B2 | 8/2019 | Koike |
| 10,782,209 | B2 | 9/2020 | Matuszny et al. |
| 11,549,863 | B2 | 1/2023 | Matuszny et al. |
| 11,867,588 | B2 | 1/2024 | Matsumoto et al. |
| 2003/0061719 | A1 | 4/2003 | Gerdes |
| 2007/0280573 | A1 | 12/2007 | Yoshikawa et al. |
| 2008/0282789 | A1 | 11/2008 | Regis et al. |
| 2010/0064789 | A1 | 3/2010 | Schraudolf et al. |
| 2010/0254648 | A1 | 10/2010 | Yoshikawa et al. |
| 2011/0048120 | A1 | 3/2011 | Dank et al. |
| 2012/0260726 | A1 * | 10/2012 | Cuttino ............... G01M 17/021 73/146 |
| 2013/0006514 | A1 | 1/2013 | Martin et al. |
| 2014/0090461 | A1 | 4/2014 | Cuttino |
| 2014/0250997 | A1 | 9/2014 | Sprenger et al. |
| 2014/0260583 | A1 | 9/2014 | Vernyi et al. |
| 2016/0054199 | A1 | 2/2016 | Fritz et al. |
| 2017/0115187 | A1 | 4/2017 | Symens et al. |
| 2021/0025784 | A1 | 1/2021 | Matsumoto et al. |
| 2022/0244143 | A1 | 8/2022 | Matsumoto et al. |
| 2023/0213411 | A1 | 7/2023 | Matsumoto et al. |
| 2024/0060858 | A1 | 2/2024 | Matsumoto et al. |

FOREIGN PATENT DOCUMENTS

| | | |
|---|---|---|
| EP | 2 192 567 B1 | 8/2016 |
| JP | H08-64564 A | 3/1996 |
| JP | 2003269948 A | 9/2003 |
| JP | 2007-522467 A | 8/2007 |
| JP | 2007-309508 A | 11/2007 |
| JP | 2009-180715 A | 8/2009 |
| JP | 2013-520667 A | 6/2013 |
| JP | 2013-156087 A | 8/2013 |
| JP | 2013-238565 A | 11/2013 |
| JP | 2014-020807 A | 2/2014 |
| JP | 2014-181958 A | 9/2014 |
| JP | 2015-072215 A | 4/2015 |
| JP | 2016-080414 A | 5/2016 |
| JP | 2019-124693 A | 7/2019 |
| KR | 10-2005187 B1 | 7/2019 |
| WO | 2019/203359 A1 | 10/2019 |

OTHER PUBLICATIONS

Jul. 23, 2019 International Search Report issued in International Patent Application No. PCT/JP2019/016890.
Feb. 7, 2022 Extended European Search Report issued in European Patent Application No. 19788227.7.
Dec. 28, 2020 International Search Report issued in International Application No. PCT/JP2020/040018.
Aug. 12, 2020 International Preliminary Report on Patentability issued in International Patent Application No. PCT/JP2019/016890.
U.S. Appl. No. 17/071,252, filed Oct. 15, 2020 in the name of Matsumoto et al.
Jan. 31, 2022 International Preliminary Report on Patentability issued in Patent Application No. PCT/JP2020/040018.
Aug. 16, 2023 Notice of Allowance issued in U.S. Appl. No. 17/071,252.
Aug. 28, 2023 Notice of Allowance issued in U.S. Appl. No. 17/071,252.
Dec. 28, 2021 International Search Report issued in International Patent Application No. PCT/JP2021/035867.
U.S. Appl. No. 18/182,433, filed Mar. 13, 2023 in the name of Matsumoto et al.
Feb. 2, 2024 Extended Search Report issued in European Patent Application No. 23196877.7.
Aug. 8, 2022 Office Action issued in Chinese Patent Application No. 201980027057.1.
Sep. 6, 2023 Search Report issued in European Patent Application No. 20879611.0.
Sep. 16, 2024 Extended European Search Report issued in European Application No. 21875695.5.
May 20, 2024 U.S. Office Action issued in U.S. Appl. No. 18/385,562.
Aug. 19, 2024 Notice of Allowance issued in U.S. Appl. No. 18/385,562.
Dec. 12, 2024 Office Action issued in Chinese Patent Application No. 202080074663.1.

* cited by examiner

TIRE TESTING DEVICE

CROSS REFERENCE TO RELATED APPLICATIONS

This is a Continuation-in-Part of International Application No. PCT/JP2020/040018 filed on Oct. 23, 2020, which claims priority from Japanese Patent Application No. 2019-194640 filed on Oct. 25, 2019. The entire disclosures of the prior applications are incorporated herein by reference.

BACKGROUND

Technical Field

The present disclosure relates to a tire testing device.

Related Art

Since tire performance is influenced by conditions of road surfaces, the tire performance needs to be evaluated for road surfaces of various conditions. Tests to evaluate the tire performance include, for instance, on-road tests in which tests are performed by mounting test tires on wheel rims of a dedicated test vehicle and making the test vehicle to run on actual road surfaces, and indoor tests (bench tests) in which tests are performed by using testing devices installed in the room.

A conventional testing device to be used in the bench tests of tires includes a rotating drum to which a simulated road surface is provided on its outer peripheral surface, and the test is performed by causing a test tire and the drum to rotate in a state where the test tire is made to contact with the simulated road surface.

SUMMARY

The bench tests are more accurate and more efficient than the on-road tests. However, in the conventional testing devices for the bench test, since the simulated road surface is made to run at high speed during the test, it is difficult to perform the test in road surface conditions in which the road surface is covered with rain, snow, gravel or the like.

Aspects of the present disclosure are advantageous to provide one or more tire testing devices that are capable of performing bench tests in various road surface conditions.

According to aspects of the present disclosure, there is provided a tire testing device including a road surface, a carriage configured to rotatably hold a test wheel on which a test tire is mounted and capable of traveling along the road surface in a state where the test tire is in contact with the road surface, and a guide mechanism configured to guide movement of the carriage in a traveling direction. The guide mechanism includes a rail extending in the traveling direction of the carriage, and a runner fixed to the carriage and capable of travelling on the rail. The runner includes a roller capable of rolling on the rail, and a bearing configured to rotatably support the roller. The bearing is a rolling bearing including rolling elements rolling on a circular track. The runner includes a plurality of the rollers, and the plurality of rollers include a first roller capable of rolling on an upper surface of a head of the rail, and at least one of a second roller capable of rolling on a lower surface of the head of the rail and a third roller capable of rolling on a side surface of the head of the rail. The tire testing device includes a plurality of the guide mechanisms including a first guide mechanism and a second guide mechanism whose rails are arranged parallel to each other in a width direction. In the first guide mechanism, the rollers except for the first roller are disposed only on one side of the rail in the width direction, and in the second guide mechanism, the rollers except for the first roller are disposed only on an other side of the rail in the width direction.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments of the present disclosure will be described with reference to the drawings. In the following description, the same or corresponding numerals are assigned to the same or corresponding components, and redundant descriptions are herein omitted. In each drawing, in a case where a plurality of items whose numerals are in common are shown, the numeral is not necessarily assigned to all of the plurality of items, and assignment of the numeral to some of the plurality of items is appropriately omitted.

Figure 1:
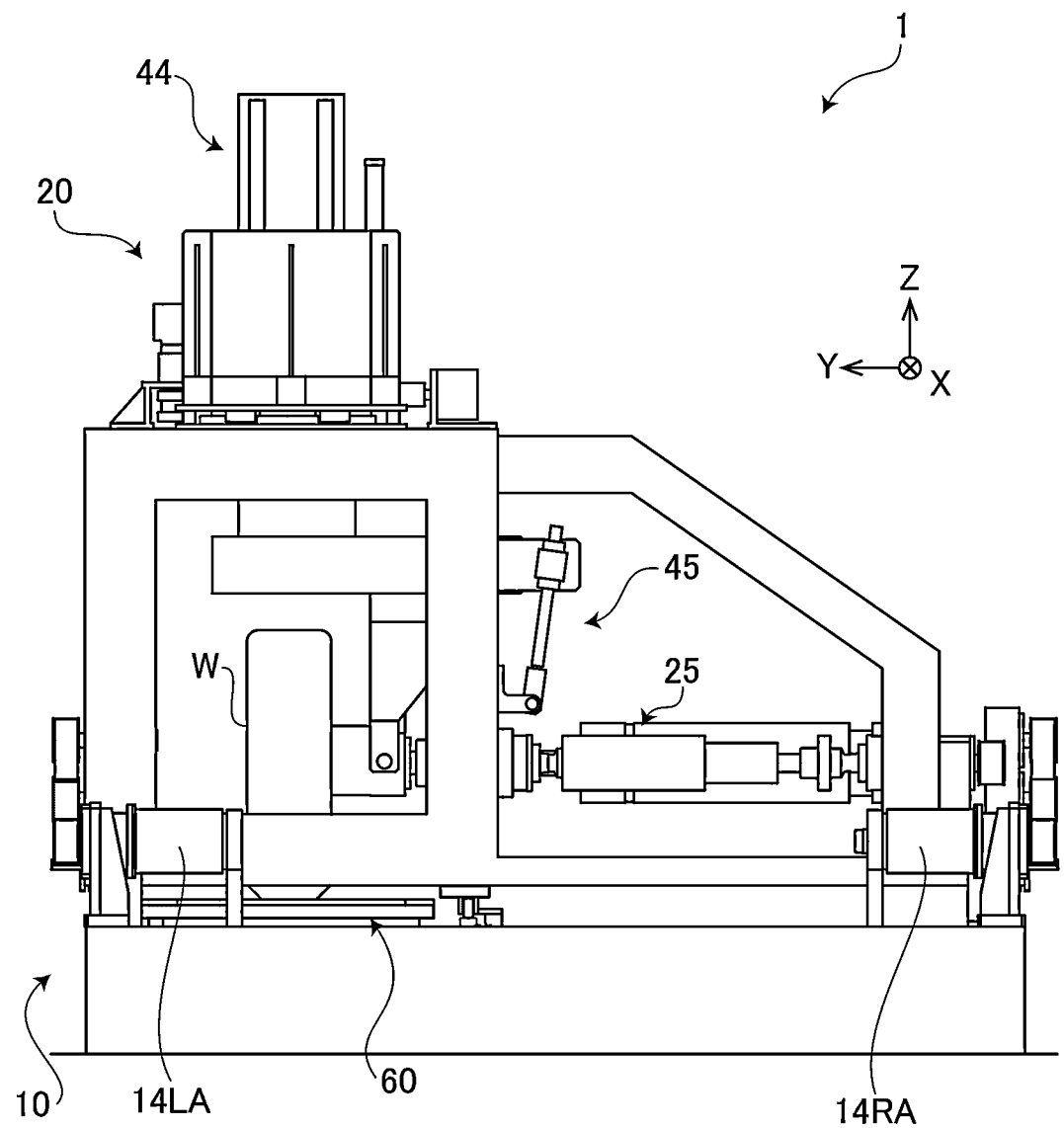
FIG. 1 is a front view of a tire testing device according to an illustrative embodiment of the present disclosure.
Figure 2:
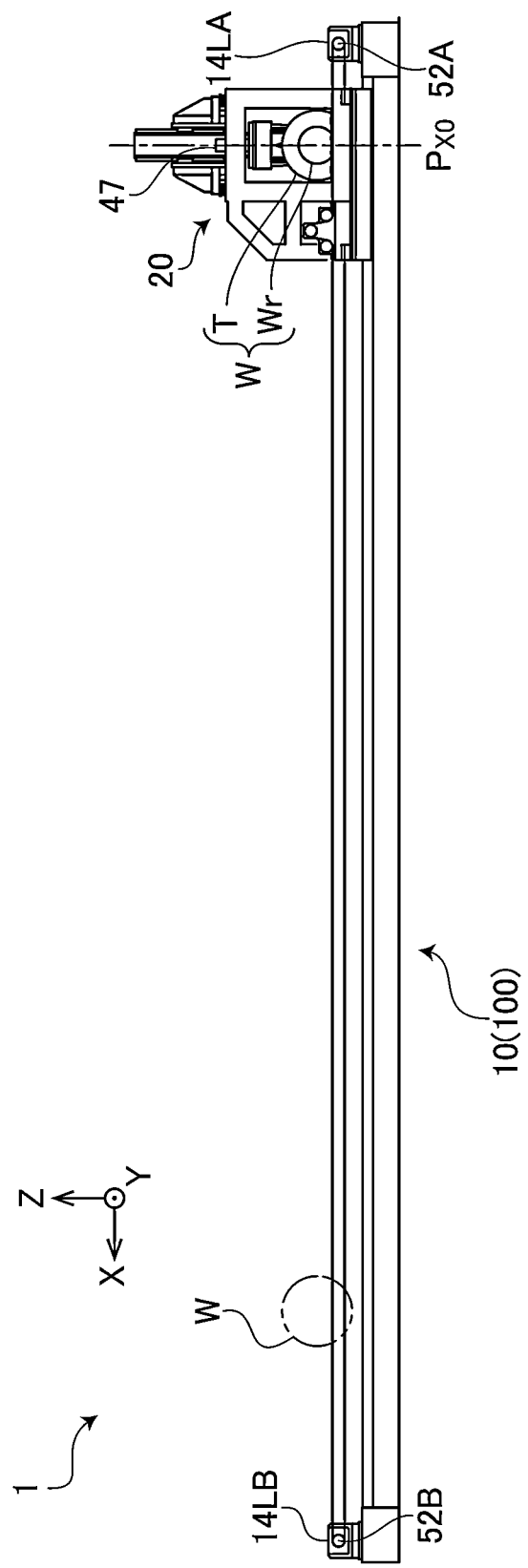
FIG. 2 is a side view of the tire testing device according to the illustrative embodiment of the present disclosure.
Figure 3:
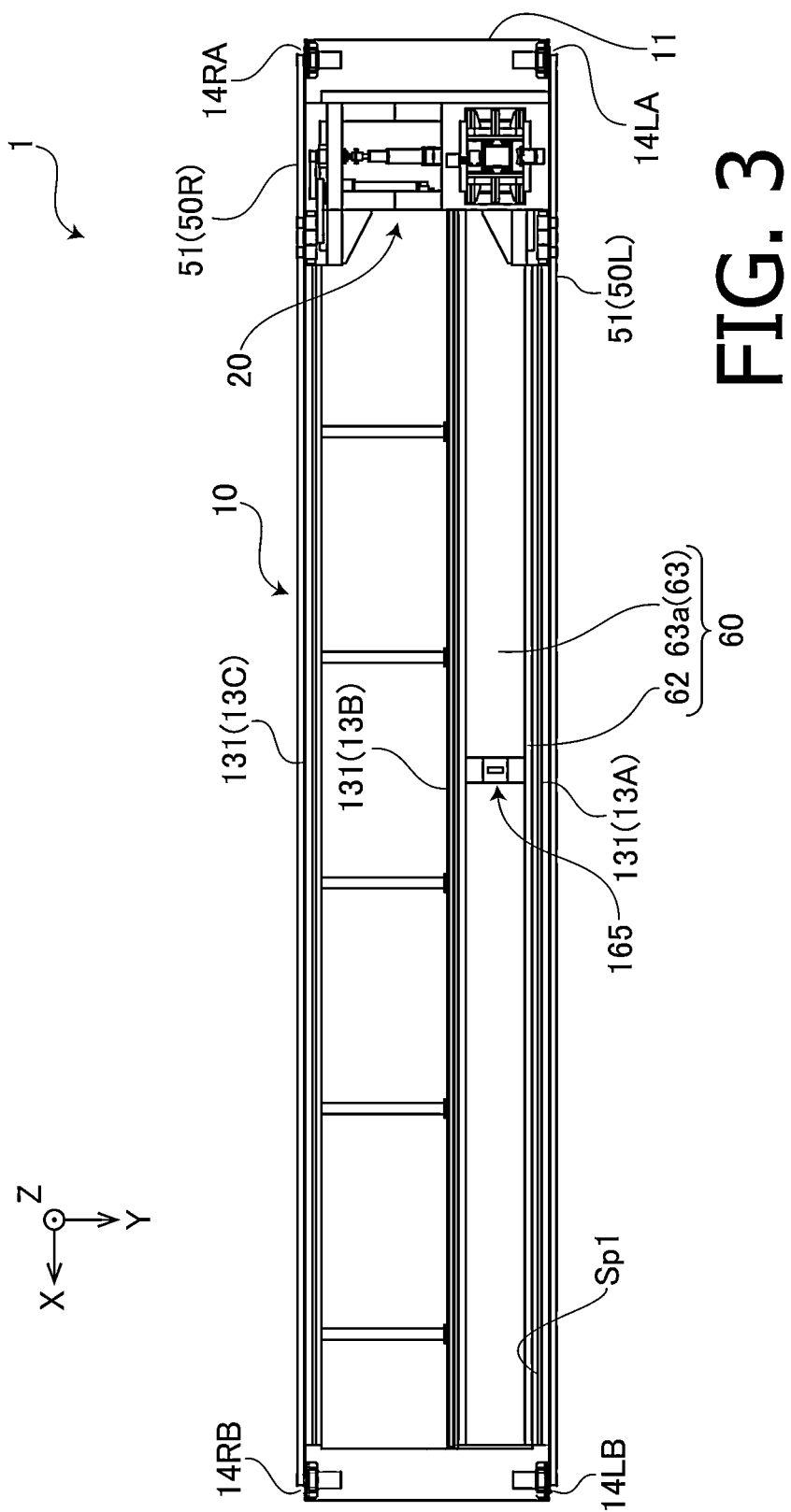
FIG. 3 is a plan view of the tire testing device according to the illustrative embodiment of the present disclosure.
Figure 4:
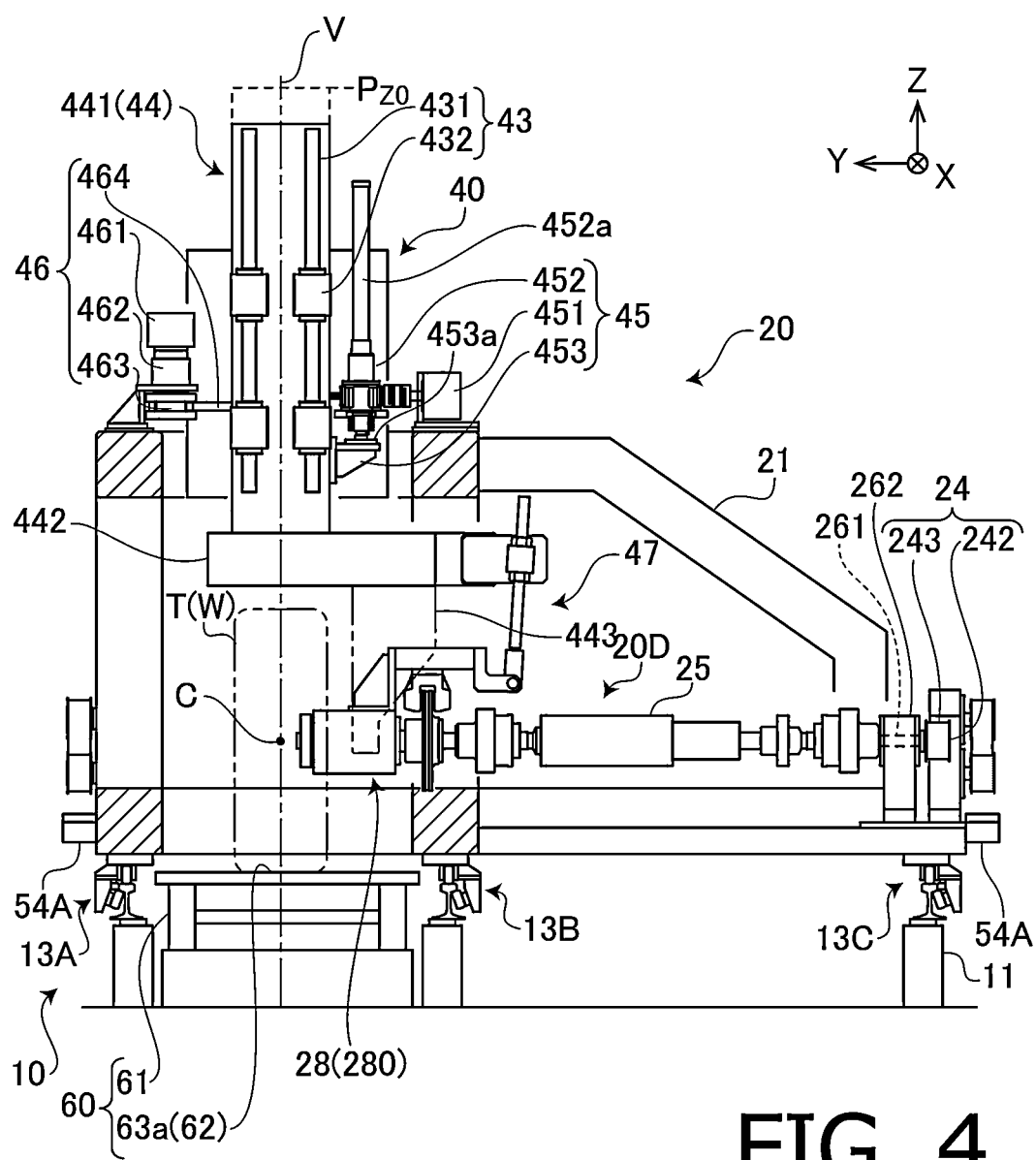
FIG. 4 is a diagram showing structures of and around a carriage.
Figure 5:
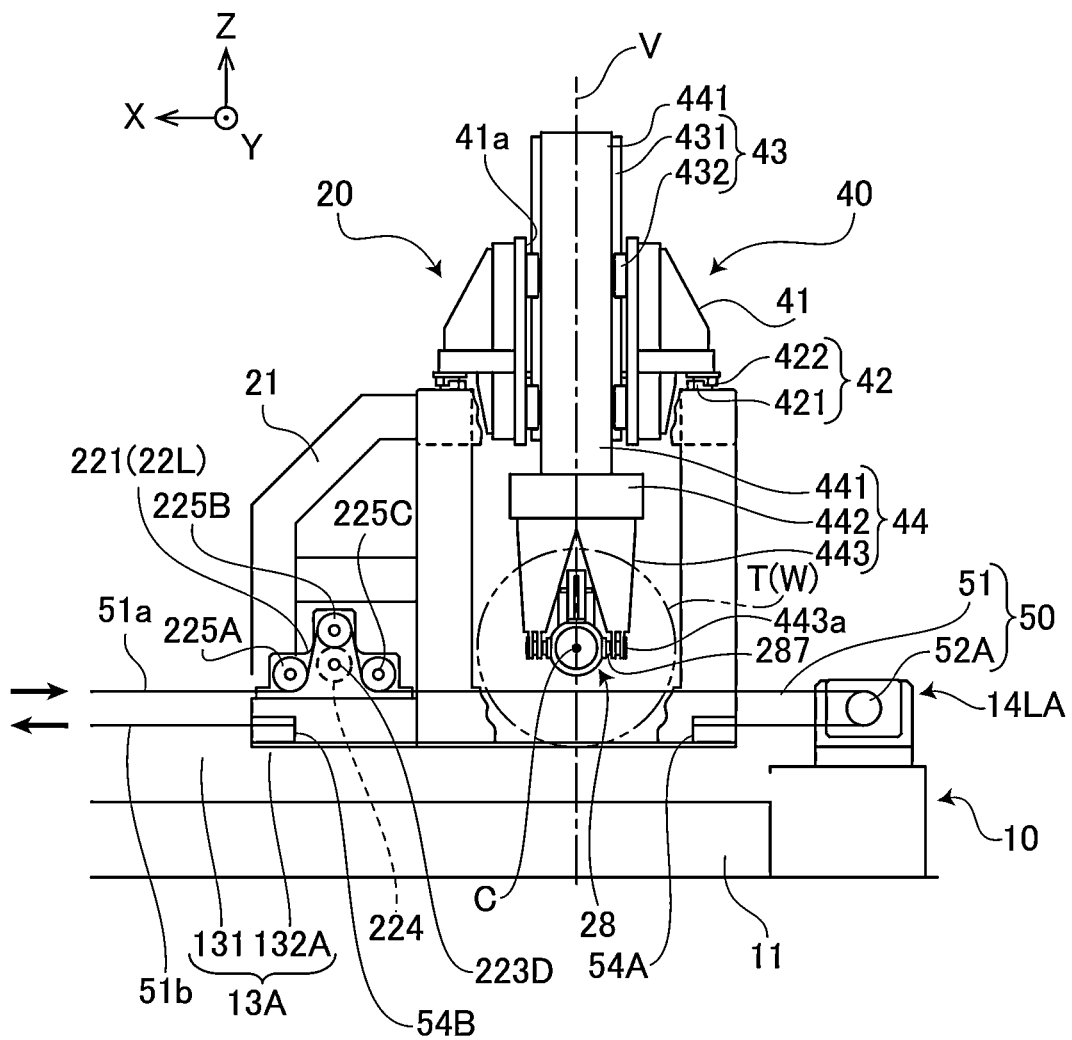
FIG. 5 is a diagram showing structures of and around the carriage.
Figure 6:
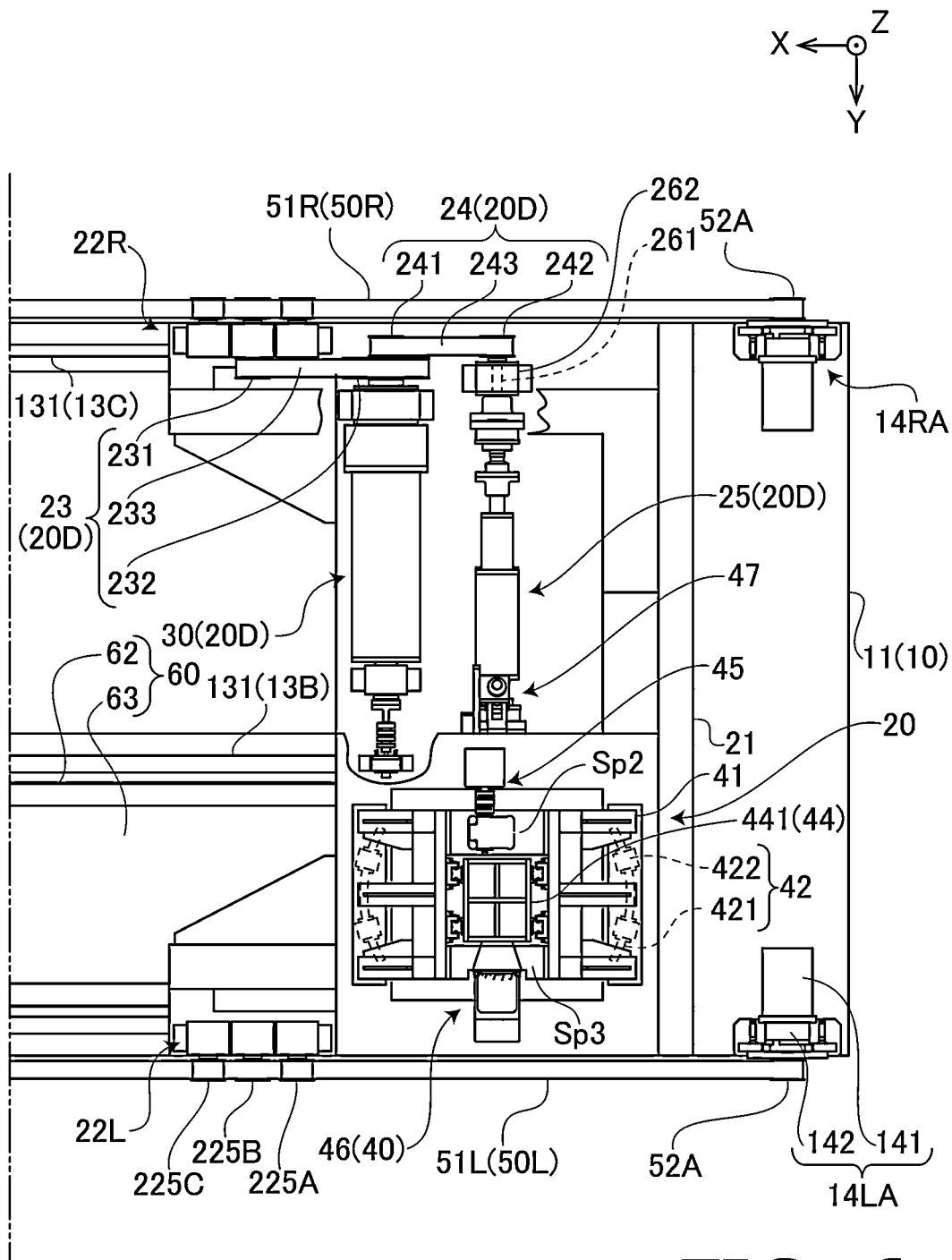
FIG. 6 is a diagram showing structures of and around the carriage.

FIGS. 1, 2 and 3 are a front view, a left side view and a plan view of a tire testing device 1 according to an illustrative embodiment of the present disclosure, respectively. FIGS. 4, 5 and 6 are a front view, a left side view and a plan view showing structures of and around a carriage 20 which will be described later, respectively. In FIGS. 4 to 6, for convenience of explanation, some components are omitted or shown in cross-sections.

In FIGS. 2 and 5, a direction from the right to the left is defined as an X axis direction, a direction perpendicular to the paper from the back side to the front side is defined as a Y axis direction, and a direction from the bottom to the top is defined as a Z axis direction. The X axis direction and the Y axis direction are horizontal directions orthogonal to each other, and the Z axis direction is a vertical direction. Also, a front-rear direction, an up-down direction and a left-right direction are defined as directions when facing a travelling direction of a carriage 20 (X axis positive direction). That is, an X axis positive direction is defined as front, an X axis negative direction is defined as rear, a Y axis positive direction is defined as left, a Y axis negative direction is defined as right, a Z axis positive direction is defined as up, and a Z axis negative direction is defined as down.

The tire testing device 1 includes a track part 10 and a road surface part 60 elongated in the X axis direction, and a carriage 20 that is capable of travelling on the track part 10 in the X axis direction. As shown in FIG. 3, to a left portion of the track part 10, an elongated space Sp1 extending over substantially the entire length of the track part 10 in the X axis direction is provided. The road surface part 60 is accommodated in this space Sp1. On an upper surface of the road surface part 60, a road surface 63a with which a test tire T mounted to the carriage 20 contacts is provided. In the present embodiment, in order to make it possible to replace the road surface part 60 in accordance with test conditions, the track part 10 and the road surface part 60 are separated from each other. It should be noted that a base frame 11 (hereinafter abbreviated to a "base 11") of the track part 10 and a frame 61 of the road surface part 60 may be integrated.

As shown in FIG. 2, to the carriage 20, a test wheel W (a wheel rim Wr to which the test tire T is mounted) is attached. When performing the test, the carriage 20 travels in a state where the test wheel W is in contact with the road surface 63a, and the test tire T rolls on the road surface 63a.

As shown in FIGS. 3 and 4, the track part 10 includes a plurality of (in the present embodiment, three) guide mechanisms 13A, 13B and 13C configured to guide movement of the carriage 20 in the X axis direction, and one or more drive parts 14 (FIG. 3) configured to generate mechanical power for driving the carriage 20. The drive part 14 serves as a first power generating unit that generates power to be used for driving the carriage 20 and the test wheel W. In the present embodiment, two pairs of the drive parts 14 (a pair of drive parts 14LA and 14LB on the left and a pair of drive parts 14RA and 14RB on the right) are mounted on the base 11 of the track part 10 near four corners of the base 11. The drive parts 14LA and 14RA are arranged at a rear end portion of the track part 10, and the drive parts 14LB and 14RB are arranged at a front end portion of the track part 10.

As shown in FIG. 6, each drive part 14 includes a servo motor 141, and an optional reducer 142 configured to reduce rotating speed of output from the servo motor 141. As will be described later, the drive parts 14RA and 14RB on the right serve both as a carriage driving unit for driving the carriage 20 to travel and as a rotational motion supplying unit for supplying, to the test wheel W, rotational motion of rotating speed corresponding to a travelling speed of the carriage 20. The drive parts 14LA and 14LB on the left serve as carriage driving unit.

In the present embodiment, as the servo motor 141, a super-low inertia and high-power type AC servo motor with an inertia moment of a rotating part being equal to or less than 0.01 kg·m2 (preferably equal to or less than 0.008 kg·m2) and with a rated power of 3 to 60 kW (7 to 37 kW being more suitable for practical use) is used.

The tire testing device 1 includes a pair of belt mechanisms 50 (50L, 50R) on each of the left side and the right side. The belt mechanisms 50 transmit power generated by the drive parts 14 to the carriage 20 and drives the carriage 20 in the X axis direction. Each belt mechanism 50 includes a toothed belt 51 and a pair of drive pulleys 52 (52A, 52B). The drive pulleys 52 are toothed pulleys that engage with the toothed belt 51.

The toothed belt 51 has core wires made of steel wires. It should be noted that a toothed belt having core wires made of so-called super fiber such as carbon fiber, aramid fiber or ultra-high molecular weight polyethylene fiber may be used as the toothed belt 51. By the use of light-weight and high-strength core wires such as carbon core wires, it becomes possible to drive the carriage 20 at high acceleration (or to apply high driving/braking force to the test wheel W) using a motor of relatively low output power, and thus it becomes possible to downsize the tire testing device 1. Further, when using a motor having the same output power, by using the lightweight toothed belt 51 having a core wire formed of so-called super fiber, it is possible to improve the performance of the tire testing device 1.

The belt mechanism 50R on the right serves both as a carriage driving unit for driving the carriage 20 to travel and as a primary power transmitting part for transmitting power supplied from the rotational motion supplying unit (drive parts 14RA, 14RB) to a secondary power transmitting part which will be described later. The belt mechanism 50L on the left serves as a carriage driving unit.

In the following description, as for components that are provided as a pair on the left side and on the right side, as a general rule, the one on the left side will be described, and the one on the right side will be written together in bracket to omit redundant description.

The toothed belt 51 of the belt mechanism 50L [50R] on the left [right] is wound around the pair of drive pulleys 52 (52A, 52B) and three driven pulleys 225 (225A, 225B, 225C) of a driven part 22L [22R] on the left [right] which will be described later. The pair of drive pulleys 52A, 52B are respectively coupled to output shafts of the pair of drive parts 14LA, 14LB [14RA, 14RB] on the left [right].

As shown in FIG. 5, both ends of each toothed belt 51 are fixed to a main frame 21 of the carriage 20 with respective belt clamps 54 (54A, 54B), thereby each toothed belt 51 forming a loop via the carriage 20. The pair of drive pulleys 52A, 52B (FIG. 2) of the belt mechanism 50 are fixed pulleys that are arranged across an area through which the carriage 20 can travel and that are held on the base 11 (i.e., pulleys whose respective centers of gravity are fixed with respect to the base 11). The driven pulleys 225 (FIG. 5) are movable pulleys that are held on the carriage 20 and can move in the X axis direction together with the carriage 20.

In the present embodiment, the pair of drive parts 14LA, 14LB [14RA, 14RB] are driven in the same phase. Effective diameters (i.e., pitch circle diameters) or numbers of teeth of the drive pulleys 52 and the driven pulleys 225 are the same. The drive parts 14LA, 14LB on the left and the drive parts 14RA, 14RB on the right are mounted with the left side and the right side reversed and are driven in opposite phases. As the toothed belt 51L [51R] is driven by the drive parts 14LA, 14LB [14RA, 14RB], the carriage 20 is pulled by the toothed belt 51L [51R] and is driven in the X axis direction.

Next, the guide mechanism 13 (13A, 13B, 13C) will be described.

Figure 7:
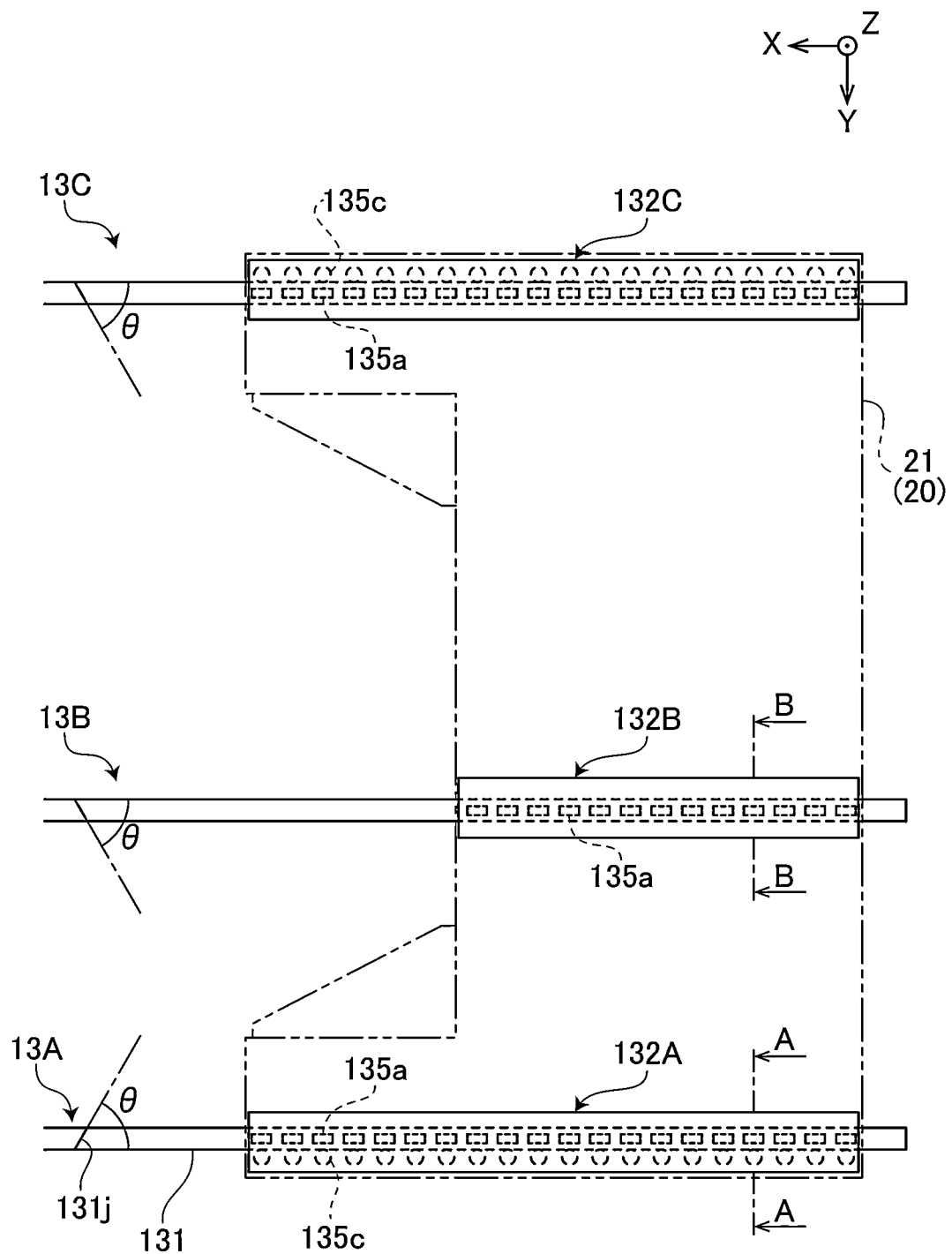
FIG. 7 is a diagram showing arrangements of three guide mechanisms.

FIG. 7 is a diagram showing arrangements of three guide mechanisms 13A, 13B and 13C.

Figure 8:
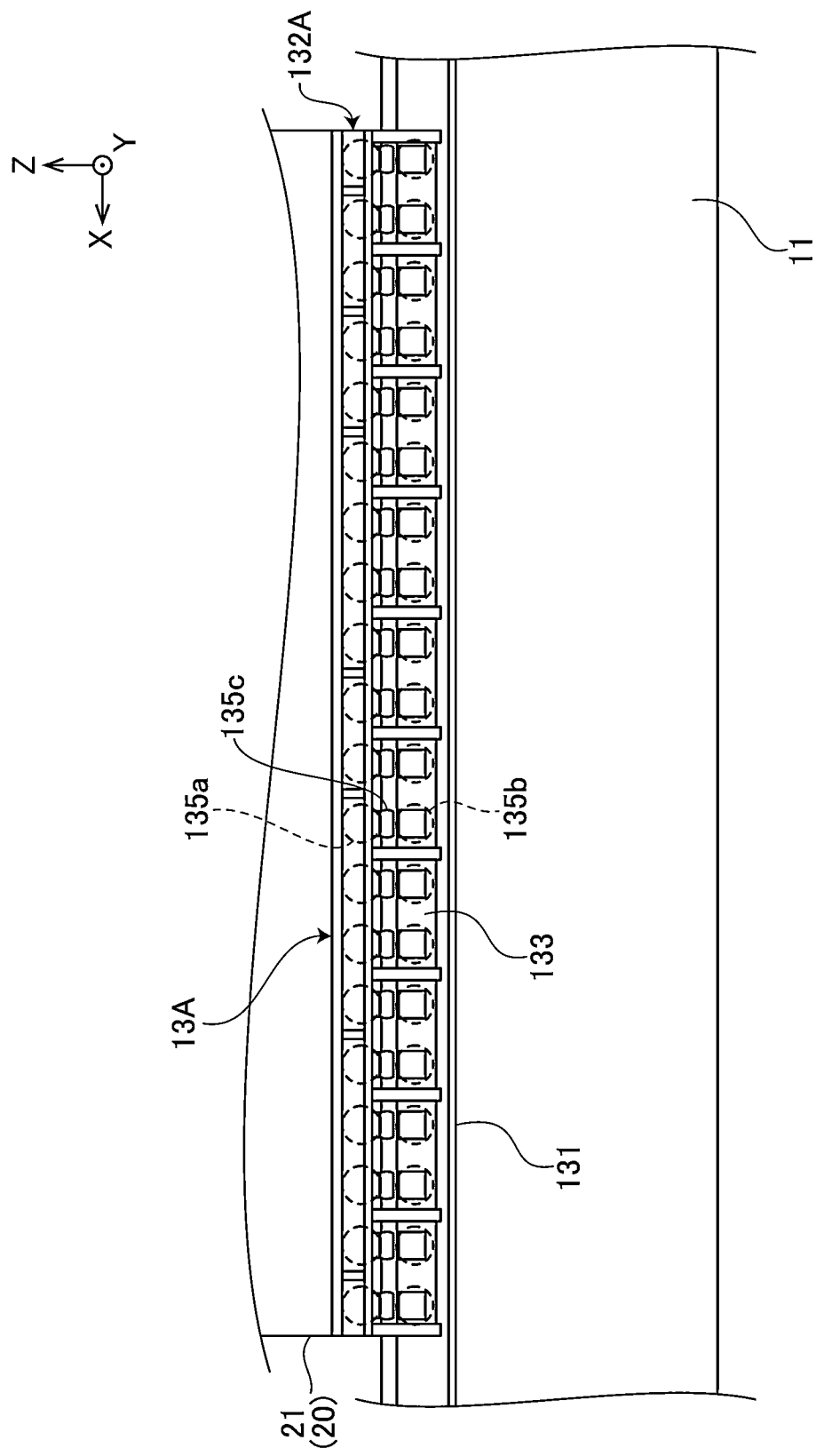
FIG. 8 is a side view in which a portion near a runner of a guide mechanism is enlarged.

FIG. 8 is a side view in which a portion near a runner 132A of the guide mechanism 13A is enlarged.

Figure 9:
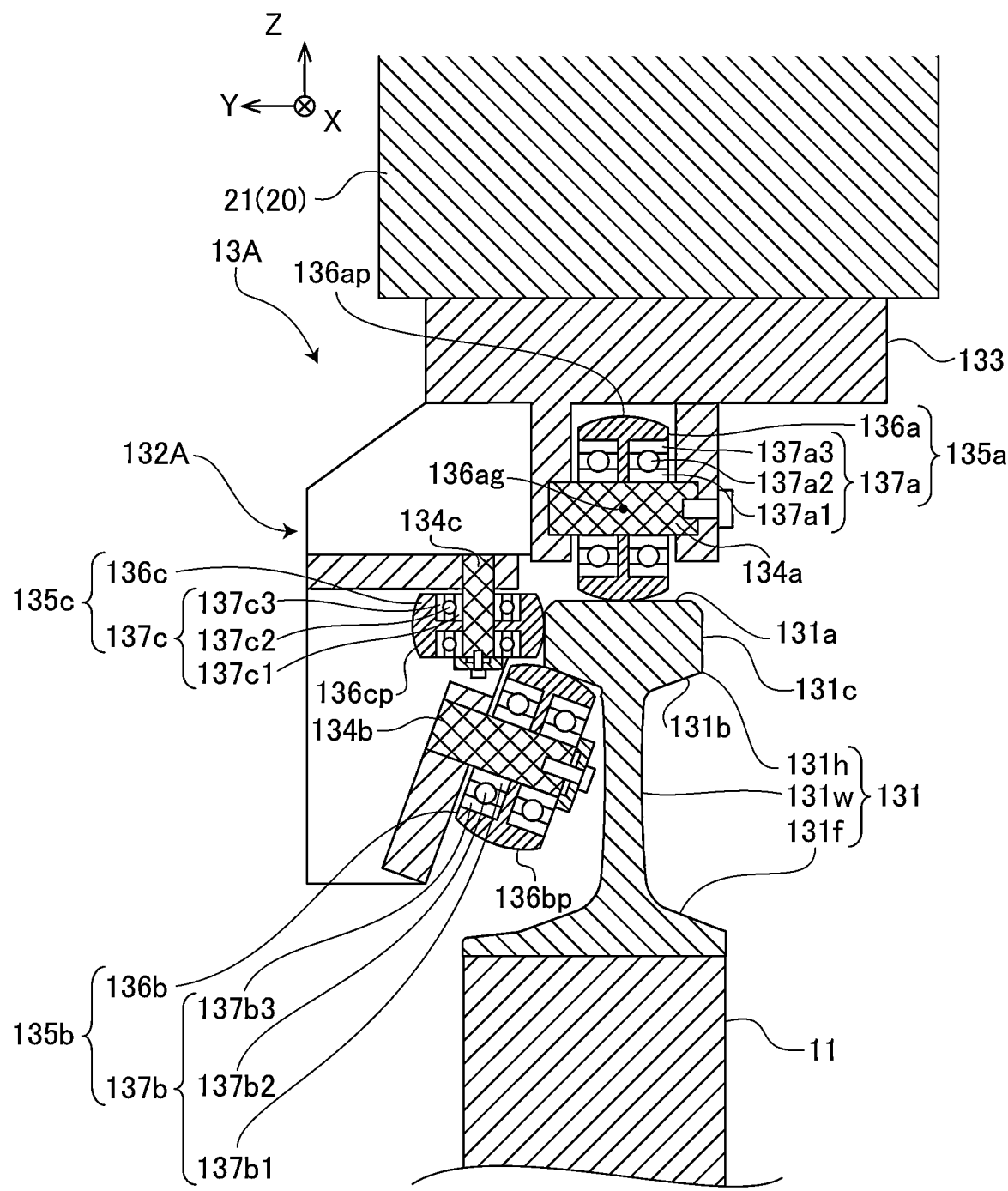
FIG. 9 is a cross-sectional view of a guide mechanism (an arrow view A-A of FIG. 7).

FIG. 9 is a cross-sectional view of the guide mechanism 13A (an arrow view A-A of FIG. 7).

Since the guide mechanism 13C is configured to be bilaterally symmetric with the guide mechanism 13A (that is, symmetric with respect to a plane parallel to the Z axis and the X axis), the guide mechanism 13A will be described in detail as a representative of both, and redundant description of the guide mechanism 13C will be omitted.

Each of the guide mechanisms 13A, 13B and 13C includes a rail 131 extending in the X axis direction and forming a track, and one or more carriages (in the present embodiment, one carriage) (hereinafter referred to as "runners") 132A, 132B or 132C that can travel on the rail 131.

The rail 131 is laid on an upper surface of the base 11 of the track part 10. The rails 131 of the two guide mechanisms 13A and 13B are arranged along both ends of the space Sp1 (FIG. 3) in the left-right direction and the rail 131 of the remaining guide mechanism 13C is arranged along a right end of the base 11, and the three rails 131 are attached to the base 11. Each of the runners 132A, 132B and 132C is attached on a lower surface of the main frame 21 of the carriage 20.

As shown in FIGS. 8 and 9, the runner 132A of the guide mechanism 13A includes a frame 133 long in the X axis direction attached to the lower surface of the main frame 21 of the carriage 20 and a plurality of sets (in the present embodiment, 20 sets) of roller assemblies 135a, 135b, and 135c. In the guide mechanism 13A of the present embodiment, three roller assemblies 135a, 135b and 135c constitute one unit set.

The plurality of sets of roller assemblies 135a, 135b and 135c are arranged at predetermined intervals in a longitudinal direction of the rail 131 and held by the frame 133. The roller assemblies 135b and 135c have the same configuration as the roller assembly 135a (however, the roller assembly 135c is different in size from the roller assembly 135a). Therefore, the roller assembly 135a will be described as a representative of the roller assemblies, and redundant description of the roller assemblies 135b and 135c (rollers 136b and 136c, bearings 137b and 137c, inner rings 137b1 and 137c1, outer rings 137b3 and 137c3, and balls 137b2 and 137c2) will be omitted.

As shown in FIG. 9, a plurality of rods 134a, 134b and 134c configured to support the roller assemblies 135a, 135b and 135c are attached to the frame 133.

The roller assembly 135a includes a roller 136a configured to roll on the rail 131, and a pair of bearings 137a configured to rotatably support the roller 136a. The bearings 137a are rolling bearings having rolling elements such as balls and rollers, and ball bearings are used in the present embodiment. An outer peripheral surface 136ap of the roller 136a is also curved in a rotation axis direction (i.e., in a longitudinal cross section shown in FIG. 9 including a rotational axis). The outer peripheral surface 136ap of the roller 136a is formed into, for example, a spherical surface centered on a center point 136ag of the roller 136a.

The bearings 137a of the roller assembly 135a are, for example, single-row radial bearings. The bearing 137a includes an inner ring 137a1 fitted to a rod 134a, an outer ring 137a3 fitted to an inner peripheral surface of the roller 136a, and balls 137a2 as a plurality of rolling elements interposed between the inner ring 137a1 and the outer ring 137a3. The balls 137a2 roll on a circular track defined by a pair of annular grooves respectively formed on an outer peripheral surface of the inner ring 137a1 and an inner peripheral surface of the outer ring 137a3.

The rail 131 is a flat-bottomed rail having a head 131h, a bottom 131f wider than the head 131h, and a narrow body 131w connecting the head 131h and the bottom 131f. The rail 131 of the present embodiment is a heat-treated rail (for example, heat-treated rail 50N-HH340) based on, for example, Japanese Industrial Standard JIS E 1120:2007 to which additional processing is applied. The heat-treated rail is a railway rail of which the head is heat-treated to improve wear resistance.

The roller assembly 135a is disposed such that the outer peripheral surface 136ap comes into contact with an upper surface 131a of the head of the rail 131 and rolls in a longitudinal direction of the rail 131 (i.e., in the X axis direction). The roller assembly 135b is disposed such that an outer peripheral surface 136bp comes into contact with one of lower surfaces 131b of the head of the rail 131 and rolls in the longitudinal direction of the rail 131. The roller assembly 135c is disposed such that an outer peripheral surface 136cp comes into contact with one of side surfaces 131c of the head of the rail 131 and rolls in the longitudinal direction of the rail 131.

The rail 131 is subjected to additional processing (e.g., grinding, polishing, or the like) for improving surface accuracy at least at portions of the upper surface 131a of the head, the left and right lower surfaces 131b of the head and the left and right side surfaces 131c of the head that come into contact with the roller assembly 135a, 135b or 135c.

As described above, the guide mechanism 13A and the guide mechanism 13C attached to the left and right end portions of the carriage 20, respectively, are configured to be bilaterally symmetric. That is, the guide mechanism 13C is configured by disposing a guide mechanism identical to the guide mechanism 13A with the right and left sides reversed (i.e., by rotating by 180 degrees about a vertical axis).

Figure 10:
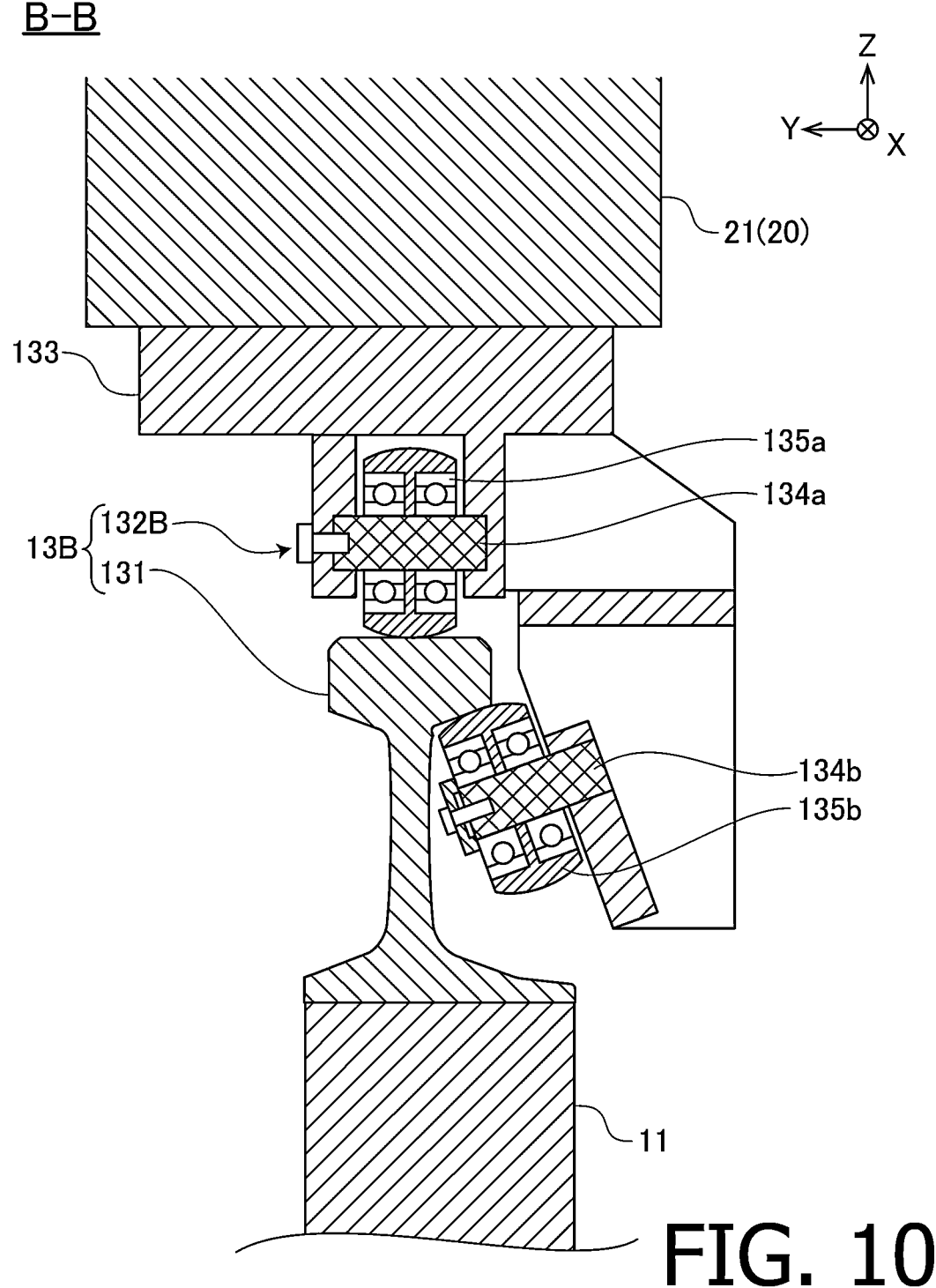
FIG. 10 is a cross-sectional view of another guide mechanism (an arrow view B-B of FIG. 7).

FIG. 10 is a transverse cross-sectional view of the guide mechanism 13B (an arrow view B-B of FIG. 7). A runner 132B of the guide mechanism 13B is a runner configured by omitting the roller assembly 135c and the rod 134c from the runner 132A of the guide mechanism 13A described above disposing and disposing the runner with the right and left sides reversed.

The roller assembly 135c and the rod 134c may be omitted from at least one of the runner 132A and the runner 132C. However, in order to position the carriage 20 in the left-right direction, at least one of the roller assembly 135b and the roller assembly 135c is provided to at least two of the runners 132A, 132B, and 132C (the runners which are disposed so as to be oriented opposite to each other in the left-right direction). The runner 132B may be provided with the roller assembly 135c and a rod 134c.

In the present embodiment, the runner 132B (FIG. 10) and the runner 132A (FIG. 9) are disposed so as to be oriented opposite to each other in the left-right direction, but the runner 132B may be disposed in the same orientation as the runner 132A in the left-right direction. Similarly, the runner 132C and the runner 132A may be disposed in the same orientation in the left-right direction. However, any two of the runner 132A, the runner 132B and the runner 132C are disposed so as to be oriented opposite to each other in the left-right direction (i.e., the roller assemblies 135b are disposed on opposite sides with respect to the rail 131 in the left-right direction).

The rail 131 of the guide mechanism 13 can be made long by connecting a plurality of short rails. In this case, as shown in FIG. 7, a joint 131j of the rail 131 may be formed not perpendicularly to the longitudinal direction (X axis direction) of the rail 131 but obliquely in plan view (i.e., inclined by an angle θ with respect to the ZX plane). By forming the joint 131j obliquely, even if the rail 131 expands or contracts due to a temperature change, the rail 131 is prevented from being curved because strain of the rail 131 is released due to sliding at the joint 131j.

When the oblique joint 131j is formed, the roller assemblies 135b and 135c (FIG. 9) are disposed on a side where the right side surface 131c of the head forms an obtuse angle with the joint 131j anterior to the joint 131j (i.e., the left side in the guide mechanism 13A and the right side in the guide mechanisms 13A and 13C). By disposing the roller assemblies 135b and 135c in this manner, even if misalignment occurs at the joint 131j of the rail 131, the roller assemblies 135b and 135c are prevented from colliding with the acute-angled end portion at the joint 131j and causing a large impact or damage.

In the present embodiment, at the joint 131j of the rail 131, end surfaces of the two rails to be connected are merely made to face against each other and are not joined to each other. However, the rails may be joined to each other at the joint 131j by welding, brazing, or the like. In addition, at the joint 131j, the end surfaces of the two rails to be connected may be brought into contact with each other, or may be made to face against each other without contact by providing a predetermined clearance between the end surfaces.

Linear bearings (so-called linear guideways) such as ball circulating linear bearings may be used in place of the guide mechanisms 13A, 13B, and 13C of the present embodiment. The ball circulating linear bearing has an oval track in which adjacent ends of two parallel linear tracks are connected to each other by a semicircular track. When a linear bearing having such linear tracks is run at high speed (e.g., at a speed of 10 km/h or more), when rolling elements move from the linear tracks to the curved tracks, centripetal forces suddenly act on the rolling elements (i.e., impact loads act on the rolling elements and the rolling surfaces of the curved tracks) and thus permanent deformations occur on the rolling elements and the rolling surfaces and performance of the linear bearing degrades. Therefore, there is a problem that the life of the linear bearings is shortened or the linear bearings are damaged when the carriage 20 is caused to travel at a speed of 10 km/h or more.

In the bearings 137a to 137c used in the guide mechanisms 13A, 13B and 13C of the present embodiment, since the rolling elements always travel on a circular trach having a constant radius of curvature, the sudden changes in the centripetal forces acting on the rolling elements (i.e., impact loads) do not occur. Therefore, for example, even when the rollers 136a to 136c are rotated at a high circumferential speed of over 60 km/h, the reduction in the life and damage on the bearings 137a to 137c do not occur. Therefore, by configuring the guide mechanisms 13A to 13C using rolling bearings whose tracks for rolling elements are circular with constant curvatures, high-speed traveling of the carriage 20 (e.g., traveling at a speed equal to or higher than 10 km/h) becomes possible. In the tire testing device 1 of the present embodiment, it is made possible for the carriage 20 to travel at a speed exceeding 85 km/h by the adoption of the above-described guide mechanisms 13A, 13B, and 13C.

As shown in FIG. 6, the carriage 20 includes the main frame 21, a pair of left and right driven parts 22L and 22R connected to the belt mechanisms 50L and 50R, respectively, a spindle part 28 (FIG. 4) configured to rotatably hold the test wheel W to which the test tire T is mounted, an alignment part 40 configured to be capable of adjusting alignment of the test wheel W with respect to the road surface 63a and load on the road surface 63a, and a spindle driving mechanism 20D configured to rotationally drive a spindle 280 (FIG. 13) of the spindle part 28. The spindle 280 is an axle to which the test wheel W is to be mounted.

Figure 11:
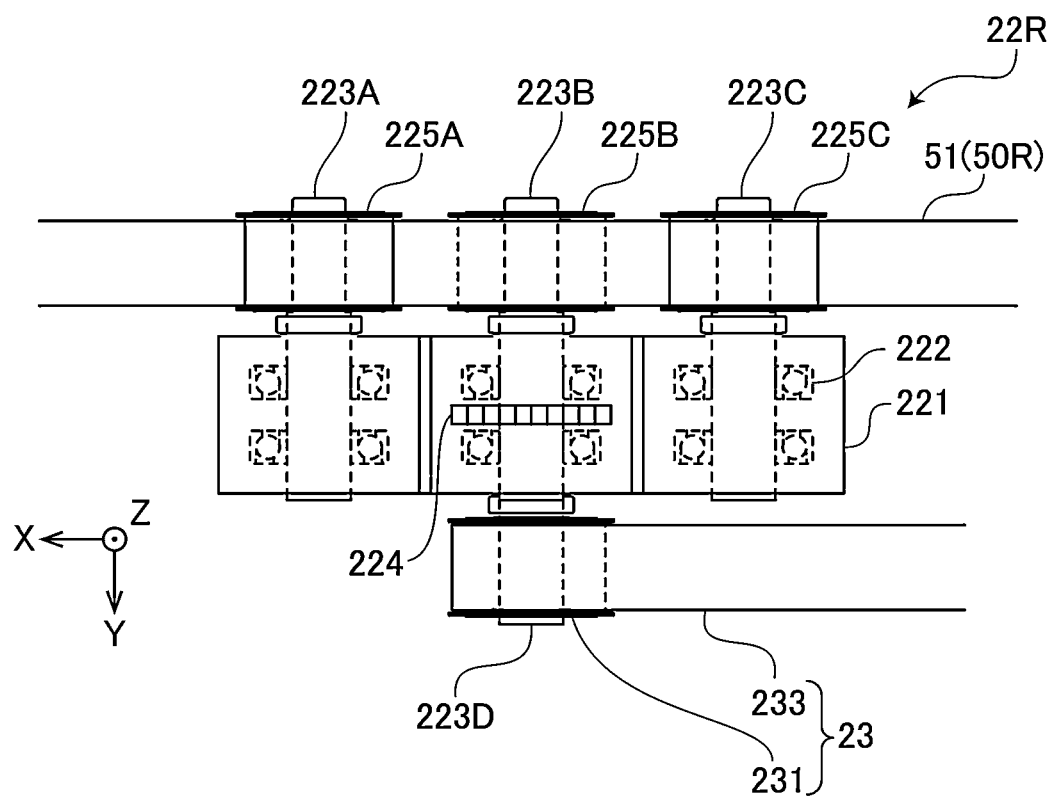
FIG. 11 is a plan view showing an outline of a structure of a driven part.

FIG. 11 is a plan view showing an outline of a structure of the driven part 22R on the right. The driven part 22R includes a frame 221, four sets of bearings 222, four shafts 223 (223A, 223B, 223C, 223D), a pair of gears 224 and three driven pulleys 225 (225A, 225B, 225C). Four through holes extending in the Y axis direction are formed to the frame 221. Each of the shafts 223A-D is rotatably supported by a set of the bearings 222 fitted in respective through holes. In the present embodiment, each of the shafts 223A-D is supported by a pair of the bearings 222, but each of the shafts 223A-D may be supported by one bearing 222 or three or more bearings 222.

One of a pair of gears 224 that mesh with each other is coupled to the shaft 223B at the upper center in the X axis direction, and the other of the pair of gears 224 is coupled to the shaft 223D at the lower center in the X axis direction. A rotation of the upper shaft 223B is transmitted to the lower shaft 223D via the pair of gears 224.

To end portions of the shafts 223A-C protruding from one face of the frame 221 (a right side face of the frame 221 when facing the travelling direction), driven pulleys 225A-C are respectively attached. Each of the driven pulleys 225A-C is a toothed pulley that meshes with the toothed belt 51 of the belt mechanism 50R. One end portion of the shaft 223D is protruding from the other face of the frame 221 (a left side face of the frame 221 when facing the travelling direction). To one end portion of the shaft 223D, a drive pulley 231 of a belt mechanism 23 which will be described later is attached. That is, the belt mechanism 50R on the right and the belt mechanism 23 are coupled via the driven part 22R on the right (specifically, the driven pulley 225B, the shaft 223B, a pair of gears 224 and the shaft 223D).

As indicated by arrows in FIG. 5, the toothed belt 51 of the belt mechanism 50 is folded back by the drive pulleys 52A and 52B to be divided into an upper portion 51a and a lower portion 51*b*. The upper portion 51*a* and the lower portion 51*b* are stretched in the travelling direction of the carriage 20 and are driven in directions opposite to each other. Specifically, the lower portion 51*b* of the toothed belt 51 which is fixed to the carriage 20 is driven in the travelling direction of the carriage along with the carriage 20, and the upper portion 51*a* is driven in a direction opposite to the carriage 20 and the lower portion 51*b*. The upper portion 51*a* of the toothed belt 51 configured to travel in the direction opposite to the carriage 20 is wound around the driven pulleys 225 attached to the carriage 20, and the driven pulleys 225 are driven by the upper portion 51*a*.

The power applied from the belt mechanism 50 to the driven part 22R on the right is transmitted to the test wheel W through the secondary power transmitting part consisting of the belt mechanism 23, the torque applying device 30, the belt mechanism 24, the slide type constant velocity joint 25 and the spindle part 28 which are shown in FIG. 6, and is used to drive the test wheel W. By such configuration of the belt mechanism 50 and the driven part 22R, it is made possible to drive both the carriage 20 and the test wheel W with the toothed belt 51.

The driven part 22L on the left is configured in the same manner as the driven part 22R on the right described above, but is configured to be bilaterally symmetrical to the driven part 22R on the right. In addition, the driven part 22L on the left is different from the driven part 22R on the right in that the driven part 22L on the left does not include a configuration for extracting a portion of the power transmitted by the belt mechanism 50R and transmitting the extracted power to the secondary power transmitting part provided to the carriage 20 (specifically, the shaft 223D, the pair of bearings 222 supporting the shaft 223D, and the pair of gears 224). Although the driven part 22L on the left is not an essential component, by providing the driven part 22L on the left, forces that the carriage 20 receives from the belt mechanisms 50L and 50R on the left and right balances and the travelling of the carriage 20 becomes stable.

As described above, in the present embodiment, the configuration in which the carriage 20 and the test wheel W are driven by using power that is transmitted by a common power transmitting device (i.e., the belt mechanism 50R) is adopted. By this configuration, it is made possible to rotationally drive the test wheel W in a peripheral speed (a rotating speed) corresponding to a travelling speed of the carriage 20 at all times regardless of the travelling speed of the carriage 20. Also, in order to reduce working amount (i.e., power consumption) of the torque applying device 30, the present embodiment is configured such that the test wheel W is rotationally driven in the peripheral speed that is substantially the same as the travelling speed of the carriage 20 when the torque applying device 30 is not active.

As shown in FIG. 6, the spindle driving mechanism 20D includes the belt mechanism 23, a torque applying device 30, a belt mechanism 24, and a slide type constant velocity joint 25. Power transmitted from the belt mechanism 50R on the right to the belt mechanism 23 through the driven pulley 225B, the shaft 223B, the pair of gears 224 and the shaft 223D of the driven part 22R (FIG. 11) on the right is transmitted to the spindle part 28 (FIG. 4) through the torque applying device 30, the belt mechanism 24 and the slide type constant velocity joint 25, and rotationally drives the test wheel W mounted to the spindle part 28. That is, a portion of the power generated by the drive parts 14RA, 14RB on the right is used to drive the carriage 20, and the other portion of the power is used to rotationally drive the test wheel W. That is, the belt mechanism 50R on the right constitutes a portion of a unit for driving the carriage 20 (the carriage driving unit), and also constitutes a portion of a unit for driving the test wheel W (a test wheel driving unit). Further, together with the driven part 22R on the right, the belt mechanism 50R on the right functions as a unit for distributing the power generated by the drive parts 14RA, 14RB to the power for driving the carriage 20 and to the power for driving the test wheel W (a power distributing unit).

Figure 12:
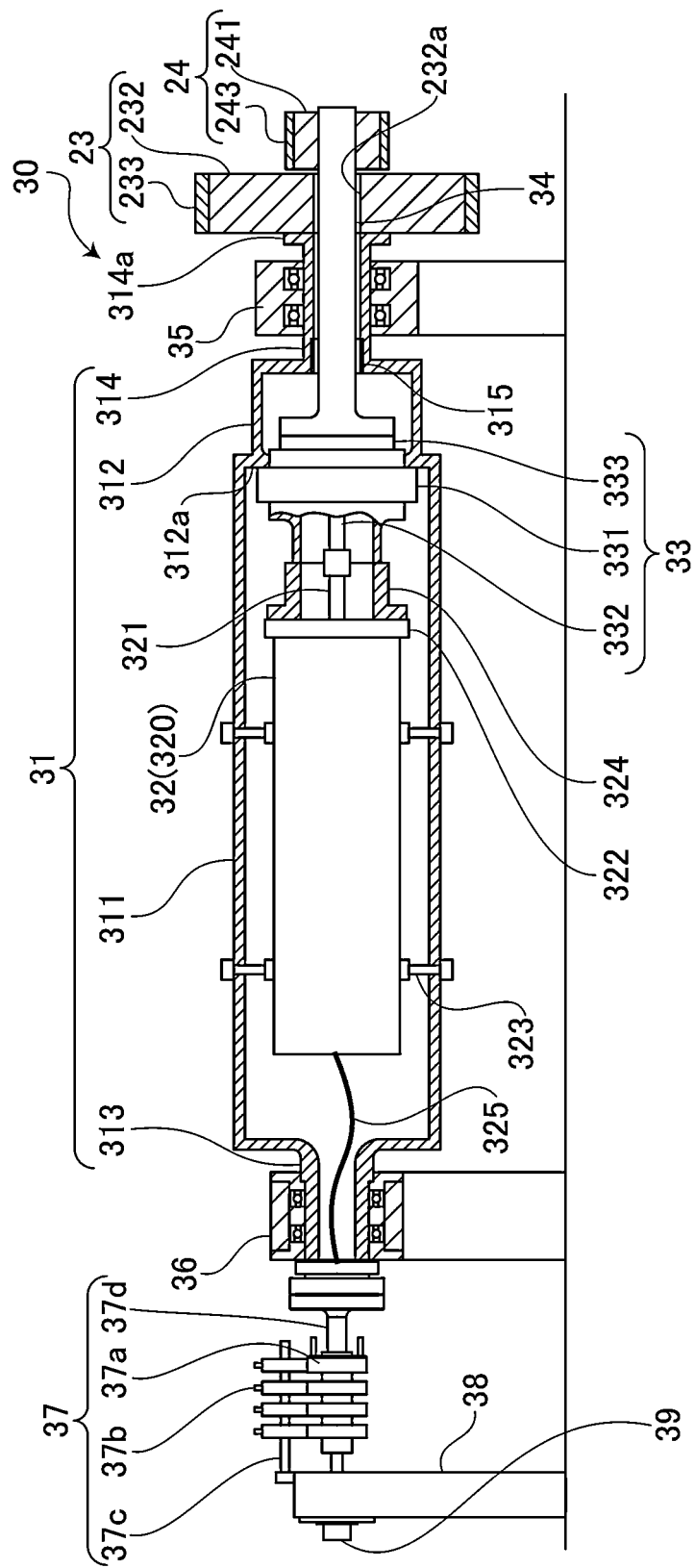
FIG. 12 is a side cross-sectional view of a torque applying device.

FIG. 12 is a side cross-sectional view of the torque applying device 30. The torque applying device 30 generates torque to be applied to the test wheel W and outputs the torque by superposing on the rotational motion transmitted by the belt mechanism 23. In other words, the torque applying device 30 can apply the torque to the test wheel W (i.e., the torque applying device 30 can apply driving force or braking force between the road surface 63*a* and the test wheel W) by changing phase of the rotational motion transmitted by the belt mechanism 23.

The torque applying device 30 functions as a second power generating unit configured to generate power for rotationally driving the test wheel W, and also functions as a power coupling unit configured to couple power generated by the servo motor 141 (first motor) of the drive part 14 (power generating unit) and power generated by a later-described servo motor 32 (second motor) of the torque applying device 30.

By incorporating the torque applying device 30 in the spindle driving mechanism 20D, it becomes possible to divide roles between a power source (the drive parts 14RA, 14RB) for controlling the rotating speed and a power source (a servo motor 32 which will be described later) for controlling the torque. Due to this configuration, it becomes possible to use a power source of a smaller capacity and to control the rotating speed and the torque to be applied to the test wheel W with higher accuracy. Also, since load that acts on the belt mechanism 50R decreases by incorporating the torque applying device 30 in the carriage 20, it becomes possible to downsize the belt mechanism 50R (e.g., decrease a number of toothed belts used) and to use members of lower load capacities.

The torque applying device 30 includes a housing 31; a servo motor 32, an optional reducer 33 and a shaft 34 that are mounted inside the housing 31; two bearing parts 35 and 36 configured to rotatably support the housing 31; a slip ring part 37; a columnar support 38 configured to support the slip ring part 37; and a rotary encoder 39 configured to detect a rotating speed of the housing 31.

In the present embodiment, as the servo motor 32, a super-low inertia and high-power type AC servo motor with an inertia moment of a rotating part being equal to or less than $0.01 \ kg \cdot m^2$ (more preferably, equal to or less than $0.008 \ kg \cdot m^2$) and with a rated power of 3 to 60 kW (more practically, 7 to 37 kW) is used.

The housing 31 has a motor accommodating part 311 and a cap part 312 being substantially cylindrical and of large diameters, and a pair of shaft parts 313, 314 being substantially cylindrical and of diameters smaller than the motor accommodating part 311. To an end portion (a left end portion in FIG. 12) of the motor accommodating part 311, the shaft part 313 is coaxially coupled (i.e., coupled in a manner such that the motor accommodating part 311 and the shaft part 313 share a center line). To the other end portion (a right end portion in FIG. 12) of the motor accommodating part 311, the shaft part 314 is coaxially coupled via the cap part 312. The shaft part 313 is rotatably supported by the bearing part 36, and the shaft part 314 is rotatably supported by the bearing part 35.

A flange 314a is formed at a tip portion of the shaft part 314, and a driven pulley 232 of the belt mechanism 23 is coaxially coupled to the flange 314a. A toothed belt 233 of the belt mechanism 23 is wound around the driven pulley 232 and the drive pulley 231 (FIG. 11). The housing 31 is rotationally driven by the belt mechanism 23.

A bearing 315 is provided on an inner periphery of the shaft part 314. The shaft 34 is inserted in a hollow portion of the shaft part 314 and is rotatably supported by the bearing 315. The shaft 34 penetrates through the shaft part 314 and the driven pulley 232. An end portion of the shaft 34 protrudes to the inside of the cap part 312. A drive pulley 241 of the belt mechanism 24 is coaxially coupled to the other end portion of the shaft 34 which penetrated through a hole 232a of the driven pulley 232. A toothed belt 243 is wound around the drive pulley 241.

The servo motor 32 is accommodated in a hollow portion of the motor accommodating part 311. A shaft 321 of the servo motor 32 is arranged coaxially with the motor accommodating part 311 (i.e., a rotation axis of the housing 31), and a motor case 320 (i.e., a stator) of the servo motor 32 is fixed to the motor accommodating part 311 with a plurality of stud bolts 323. A flange 322 of the servo motor 32 is coupled to a gear case 331 of the reducer 33 via a coupling tube 324. The gear case 331 of the reducer 33 is fixed to an inner flange 312a of the cap part 312.

The shaft 321 of the servo motor 32 is connected to an input shaft 332 of the reducer 33. The shaft 34 is connected to an output shaft 333 of the reducer 33. Torque that is output by the servo motor 32 is amplified by the reducer 33 and is transmitted to the shaft 34. Rotation output from the shaft 34 to the belt mechanism 24 is a superposition of the rotation of the housing 31 driven by the belt mechanism 23 and the torque generated by the servo motor 32 and the reducer 33. That is, the shaft part 314 of the housing 31 is an input shaft of the torque applying device 30, and the shaft 34 is an output shaft of the torque applying device 30. The torque applying device 30 outputs the torque generated by the torque applying device 30 through the output shaft by superposing the torque on the rotational motion transmitted to the input shaft.

The slip ring part 37 includes a plurality of pairs of a slip ring 37a and a brush 37b, a supporting frame 37c and a coupling tube 37d. The plurality of slip rings 37a are arranged apart from each other and are fitted and fixed on an outer periphery of the coupling tube 37d.

Figure 27:
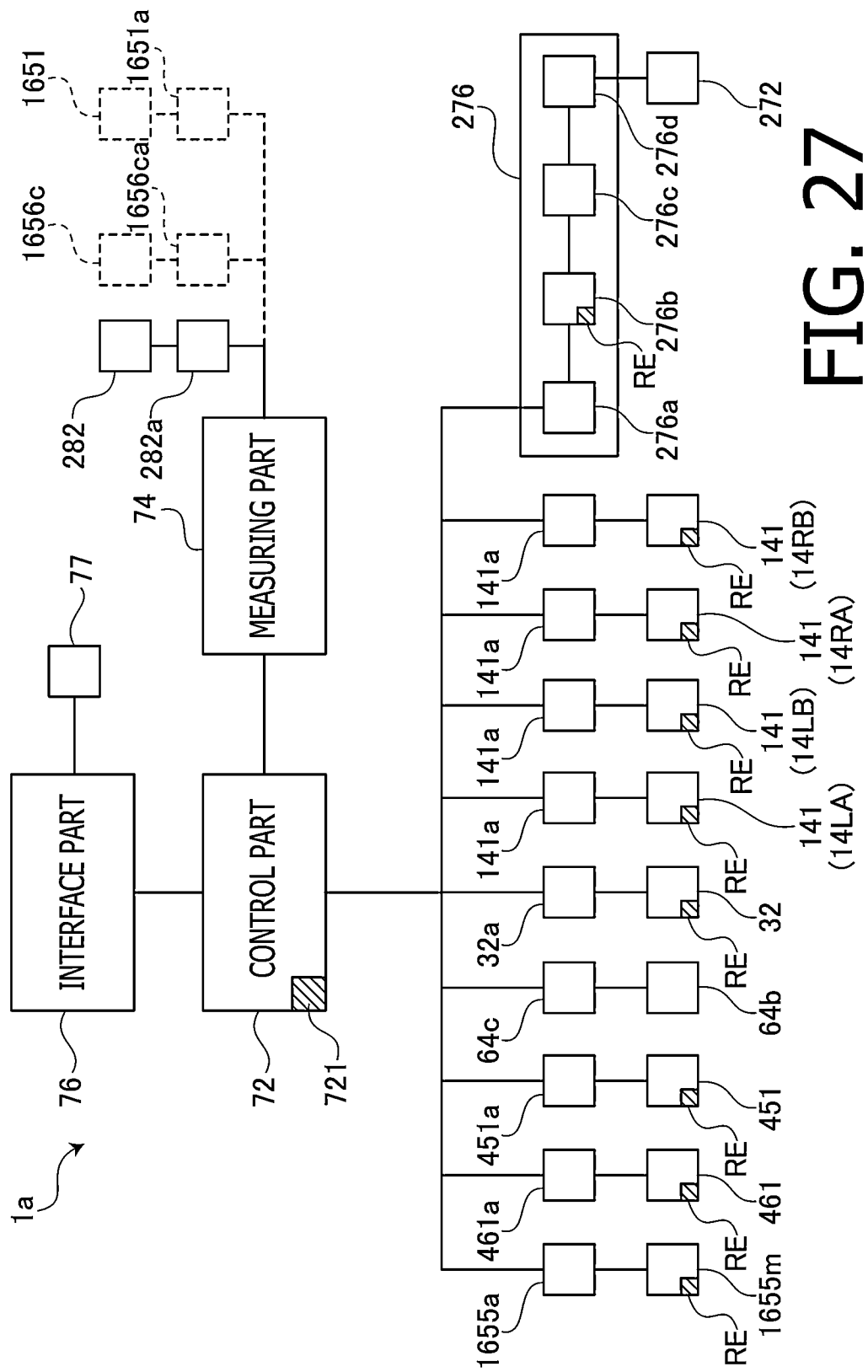
FIG. 27 is a block diagram showing an outline of a configuration a control system.

The coupling tube 37d is coaxially coupled to the shaft part 313 of the housing 31. The brushes 37b contacting outer peripheries of the corresponding slip rings 37a are supported by the supporting frame 37c attached to the columnar support 38. A cable 325 of the servo motor 32 passes through the hollow portion of the shaft part 313 and is connected to the slip rings 37a. The brushes 37b are connected to a servo amplifier 32a (FIG. 27). That is, the servo motor 32 and the servo amplifier 32a are connected to each other via the slip ring part 37.

Figure 13:
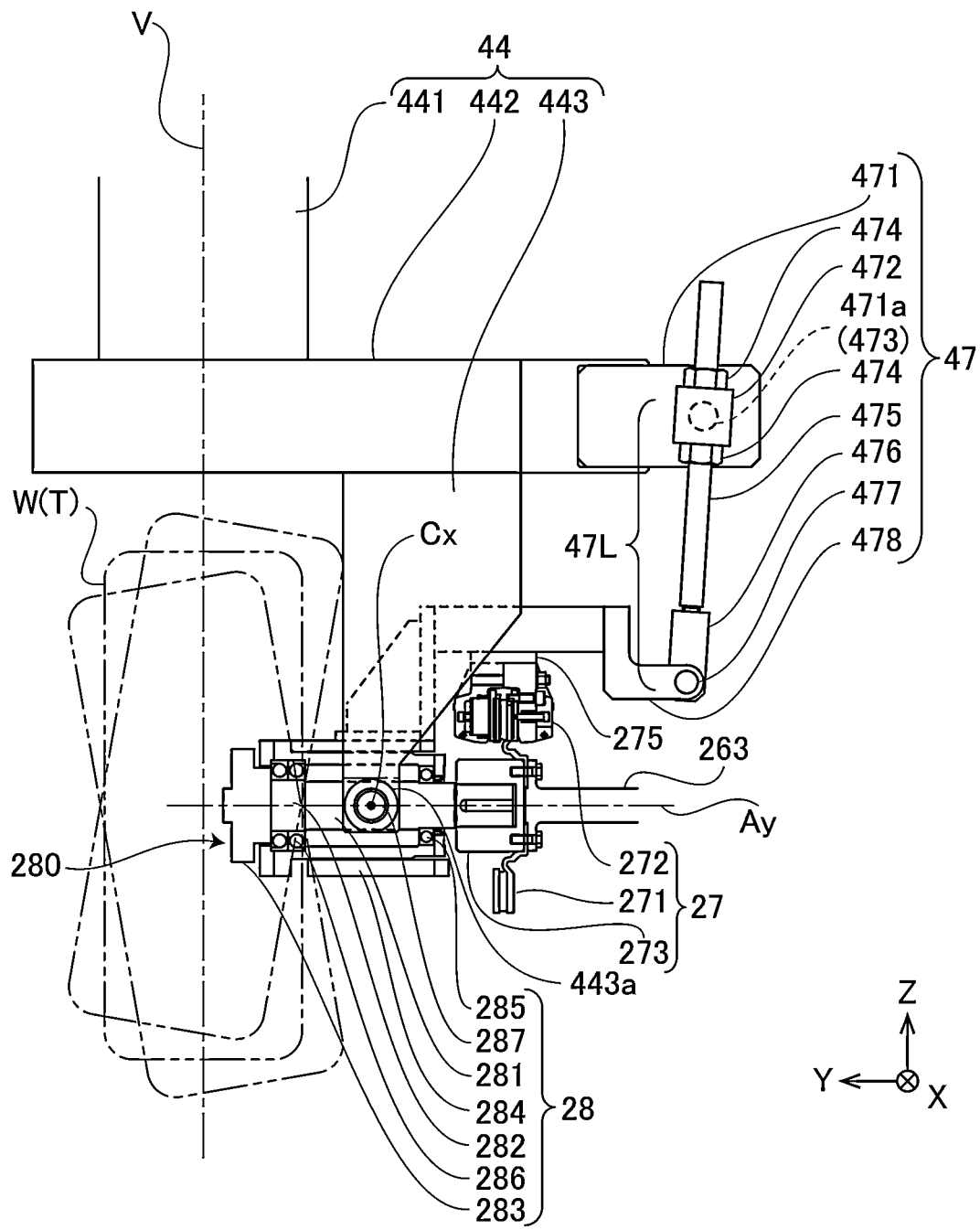
FIG. 13 is a diagram showing structures of and around a spindle.

As shown in FIGS. 4 and 6, the driven pulley 242 around which the toothed belt 243 of the belt mechanism 24 is wound is coaxially coupled to an end portion of a shaft 261 rotatably supported by the bearing part 262. The other end portion of the shaft 261 is connected to an end portion of the slide type constant velocity joint 25. The other end portion of the slide type constant velocity joint 25 is coupled to the spindle 280 (FIG. 13) via a shaft 263 (FIG. 13). The slide type constant velocity joint 25 is configured to be capable of transmitting rotation smoothly without rotation fluctuation regardless of an operating angle (i.e., an angle between the input shaft and the output shaft). The slide type constant velocity joint 25 is variable in length in its axial direction (i.e., a transmission distance).

The spindle part 28 is supported by the alignment part 40 such that its angle and position are variable. By coupling the spindle 280 (FIG. 13) and the shaft 261 held by the bearing part 262 via the slide type constant velocity joint 25, even if the angle and/or position of the spindle 280 change, the slide type constant velocity joint 25 flexibly conforms to the change. Therefore, large strain does not occur to the spindle 280 and the shafts 261, 263 (FIG. 13) and thus rotation is smoothly transmitted to the spindle 280 without change in speed.

As shown in FIG. 5, the alignment part 40 includes a pair of pivoting frames 41, a pair of curved guideways 42 (hereinafter abbreviated to "curved guides"), a slide frame 44, and two pairs of linear guides 43.

Each pivoting frame 41 is placed on the main frame 21 of the carriage 20 via the curved guide 42. The curved guide 42 includes an arc-like rail 421 attached on an upper surface of the main frame 21, and a plurality of (in the present embodiment, two) carriages 422 (hereinafter referred to as "runners 422") that can travel on the rail 421. The runners 422 are attached on a bottom surface of the pivoting frame 41. The pair of curved guides 42 and the pair of pivoting frames 41 are respectively arranged to oppose to each other in the front-rear direction across a vertical line V passing through a center C of the test wheel W. A center of curvature of each curved guide 42 is on the vertical line V. That is, each pivoting frame 41 is supported by the curved guide 42 to be pivotable about the vertical line V.

As shown in FIG. 4, the slide frame 44 has a column part 441, a coupling part 442, and a fork 443 in this order from the top. The column part 441 (i.e., an upper portion of the slide frame 44) is arranged vertically such that the center line thereof coincides with the vertical line V. The column part 441 is disposed between the pair of pivoting frames 41, and is coupled to each pivoting frame 41 via two pairs of linear guides 43 so as to be vertically slidable. The linear guide 43 includes a rail 431 attached to a side surface 441a of the column part 441 facing the pivoting frame 41, and a plurality of (in the present embodiment, two) carriages 432 (hereinafter referred to as "runners 432") capable of traveling on the rail 431. The runner 432 is attached to a side surface 41a of the pivoting frame 41 facing the column part 441.

The fork 443 (i.e., a lower portion of the slide frame 44) is set back rightward (in a direction of a rotation axis Ay) with respect to the vertical line V so as not to contact with the test wheel W. The coupling part 442 extends in the Y axis direction and couples a lower end portion of the column part 441 and an upper end portion of the fork 443 together. Therefore, the slide frame 44 is formed in a substantially crank shape when viewed in the X axis direction.

As shown in FIG. 5, a lower portion of the fork 443 is branched in the front-rear direction. To lower end portions of the fork 443 branched into two, respective bearings 443a are provided to be coaxial with respect to each other.

FIG. 13 is a diagram showing the spindle part 28 and around the same. The spindle part 28 is arranged between a pair of the bearings 443a (FIG. 5) provided to the lower end portions of the fork 443 while orienting a central axis (the rotation axis Ay) of the spindle 280 in the left-right direction. The spindle part 28 is supported by the pair of bearings 443a to be rotatable about a rotation axis Cx extending in the front-rear direction. The directions of the rotation axis Ay of the spindle 280 and the rotation axis Cx of a spindle case 284 change in accordance with the alignment of the spindle 280 and thus do not necessarily coincide with the Y axis direction and the X axis direction, respectively.

The spindle part 28 includes the spindle 280, and the spindle case 284 configured to rotatably support the spindle 280. The spindle 280 is an axle to which the test wheel W is to be mounted and that rotates integrally with the test wheel W. The spindle 280 includes a body part 281, a six force components sensor 282, and a hub 283. The body part 281 is a cylindrical shaft. The six force components sensor 282 is a substantially cylindrical member that is coaxially attached to a tip portion of the body part 281 and is a piezoelectric force sensor that is capable of detecting six force components (forces in the three axial directions orthogonal to each other and torques around respective axes). The hub 283 is a member for attaching the test wheel W and is coaxially attached to a tip of the six force components sensor 282. The body part 281, the six force components sensor 282 and the hub 283 are coupled integrally to form the spindle 280. Since the test wheel W is integrally attached to the six force components sensor 282 via the hub 283, force acting on the test wheel can be calculated from a detection result of the six force components sensor 282. Further, since the six force components sensor 282 is disposed near the center of the test wheel W, the detection result of the six force components sensor 282 can be used as an approximate value of the six force components acting on the test wheel W.

The spindle case 284 is a substantially cylindrical member configured to accommodate and rotatably hold the spindle 280. On an inner periphery of the spindle case 284, a bearing 285 and a pair of bearings 286 are attached. The spindle 280 is rotatably supported by the bearing 285 and the bearings 286.

On side faces of the spindle case 284 on the front and the rear, a pair of pivots 287 which respectively rotatably fit to the pair of bearings 443a (FIG. 5) of the fork 443 are attached. That is, the spindle part 28 is supported by the pair of bearings 443a to be rotatable about the rotation axis Cx.

As shown in FIG. 4, the alignment part 40 includes a load adjusting part 45, a slip angle adjusting part 46, and a camber adjusting part 47. The load adjusting part 45 is a unit configured to adjust load acting on the test wheel. The slip angle adjusting part 46 is a unit configured to adjust a slip angle of the test wheel W by causing the alignment part 40 (more specifically, the pivoting frame 41) to rotate about the vertical line V. The camber adjusting part 47 is a unit configured to adjust a camber angle of the test wheel W by causing the spindle part 28 to rotate about the rotation axis Cx (FIG. 13).

The load adjusting part 45 includes a servo motor 451, a motion converter 452, and a bracket 453. The above-described linear guide 43 is also one of components constituting the load adjusting part 45. The servo motor 451 is attached to the main frame 21 of the carriage 20. The motion converter 452 is a device configured to convert rotational motion of the servo motor 451 into vertical linear motion of a vertically erected movable element 452a. As the motion converter 452, for example, a rack-and-pinion mechanism, a mechanism in which an intersecting shaft such as a bevel gear and a feed screw are combined, or a mechanism in which a skewed shaft such as a worm gear or a screw gear and a feed screw are combined is used. The bracket 453 is arranged right below the movable element 452a of the motion converter 452, and is attached to a side face of the column part 441 of the slide frame 44 while facing a flange 453a up.

As the movable element 452a of the motion converter 452 is caused to descend by driving the servo motor 451, a lower end portion of the movable element 452a abuts the flange 453a of the bracket 453. As the servo motor 451 is further driven, the slide frame 44 is pressed vertically downward by the movable element 452a via the bracket 453. The test wheel W held by the alignment part 40 is thereby pressed against the road surface 63a, and load depending on a height (i.e., a position in the Z axis direction) of the movable element 452a acts between the test tire T and the road surface 63a. The load that acts on the test wheel W is detected by the six force components sensor 282 (FIG. 13) of the spindle part 28. The driving of the servo motor 451 is controlled such that the detected load coincides with a set load value.

As shown in FIG. 6, a portion of the load adjusting part 45 is arranged in a space Sp2 surrounded by the pair of pivoting frames 41 and the column part 441 of the slide frame 44. By this configuration, space is efficiently used and downsizing of the carriage is realized.

As shown in FIG. 4, the slip angle adjusting part 46 includes a servo motor 461 attached to the main frame 21 of the carriage 20, a reducer 462, a drive gear 463 coupled to an output shaft of the reducer 462, and a driven gear 464 that engages with the drive gear 463. As the drive gear 463, for example, a spur gear or a sector gear is used. The driven gear 464 is, for example, a sector gear. As the gear mechanism (the drive gear 463 and the driven gear 464) of the slip angle adjusting part 46, a worm gear, a bevel gear, a screw gear and the like may be used. The servo motor 461, the reducer 462 and the drive gear 463 are attached to the main frame 21 of the carriage 20. The driven gear 464 is attached to the side face of the column part 441 of the slide frame 44 such that a rotation axis of the driven gear 464 coincides with the vertical line V.

Rotation of the servo motor 461 is reduced by the reducer 462 and is transmitted to the driven gear 464 via the drive gear 463. The driven gear 464 and the slide frame 44 thereby rotates about the vertical line V. As a result, the test wheel W supported by the slide frame 44 via the spindle part 28 also rotates about the vertical line V and the slip angle of the test wheel W changes.

As shown in FIG. 6, a portion of the slip angle adjusting part 46 is arranged in a space Sp3 surrounded by the pair of pivoting frames 41 and the column part 441 of the slide frame 44. By this configuration, space is efficiently used and downsizing of the carriage is realized. The space Sp2 in which the load adjusting part 45 is arranged and the space Sp3 in which the slip angle adjusting part 46 is arranged are spaces that are provided on opposite sides of the column part 441 in the left-right direction. By providing the load adjusting part 45 and the slip angle adjusting part 46 in different spaces, assembly and maintenance efficiencies improve.

As shown in FIG. 13, the camber adjusting part 47 includes an upper arm 471 attached to a right end portion of the coupling part 442, a joint 472 rotatably supported by the upper arm 471, a full thread bolt 475 (hereinafter referred to as a "stud 475") to which the joint 472 is attached, a rod end 476 attached to one end portion of the stud 475, and a lower arm 478 rotatably coupled to the rod end 476 with a pin 477. An end portion of the lower arm 478 is fixed to the spindle case 284. It should be noted that the upper arm 471 may be attached to the fork 443 of the slide frame 44.

The upper arm 471 is a flat plate extending in parallel with the rotation axis Ay (i.e., in a direction away from the vertical line V), and is arranged perpendicular to the rotation axis Cx of the spindle case 284. To a tip portion of the upper arm 471, a pivot 471a parallel to the rotation axis Cx is provided.

The joint 472 is a substantially cuboidal member to which a through hole for inserting the stud 475 is formed. To the joint 472, a bearing 473 that rotatably fits to the pivot 471a of the upper arm 471 is provided. That is, the joint 472 is supported to be rotatable about the pivot 471a parallel to the rotation axis Cx of the spindle case 284. The joint 472 is nipped between a pair of nuts 474 fitted to the stud 475 and is fixed to the stud 475.

A tip portion of the lower arm 478 is coupled to a lower end portion of the rod end 476 by the pin 477. The pin 477 that couples the rod end 476 and the lower arm 478 together is a pivot parallel to the rotation axis Cx of the spindle case 284 too. That is, the slide frame 44 and upper arm 471 (a first link), the stud 475 and rod end 476 (a second link), and the lower arm 478 and spindle case 284 (a third link) are circularly coupled together via three pivots parallel to the rotation axis Cx [the pivot 471a (a first joint), the pin 477 (a second joint) and the pivot 287 (a third joint)] to be rotatable about respective pivots, thereby forming a link mechanism.

A length of a variable-length link 47L connecting the two joints (the pivot 471a and the pin 477) changes as positions of the nuts 474 along the stud 475 change. At this time, the lower arm 478 and the spindle case 284 rotates about the pivot 287 (the rotation axis Cx) and inclination of the rotation axis Ay of the spindle 280 and the test wheel W with respect to the road surface 63a changes. Therefore, it is possible to adjust the camber by elongating and contracting the variable-length link 47L by changing the positions of the nuts 474 along the stud 475. The camber changes toward the minus side when the variable-length link 47L is elongated and changes toward the plus side when the variable-length link 47L is contracted.

The tire testing device 1 includes a braking system 27 (hereinafter abbreviated to a "brake 27") that can decelerate the rotation of the spindle 280. The brake 27 includes a disc rotor 271 attached to the spindle 280 via an attachment 273 which will be described later, a caliper 272 attached to the lower arm 478, and a hydraulic pressure supplying device 276 (FIG. 27) configured to supply hydraulic pressure to the caliper 272.

The hydraulic pressure supplying device 276 generates a predetermined hydraulic pressure based on a command from a control part 72 which will be described later and supplies the hydraulic pressure to the caliper 272. The hydraulic pressure supplying device 276 includes a servo motor 276b, a motion converter 276c configured to convert rotational motion output by the servo motor 276b into linear motion, a brake master cylinder 276d configured to be driven by the linear motion output by the motion converter 276c, and a servo amplifier 276a configured to generate driving current to be supplied to the servo motor 276b based on a command from the control part 72.

The spindle 280 is coupled to the slide type constant velocity joint 25 of the spindle driving mechanism 20D (FIG. 6) via an attachment 273, the disc rotor 271 and the shaft 263.

The lower arm 478 is formed in a crank shape whose middle portion is set back upward (i.e., in a direction away from the spindle 280). The caliper 272 of the brake 27 is attached to the middle portion of the lower arm 478 being away from the spindle 280 via an attachment 275.

The attachment 273 and the shaft 263 are replaceable small members that are manufactured in accordance with a shape of the disc rotor 271. The attachment 275 is a relatively easily replaceable and low-cost small part that is manufactured in accordance with a shape of the caliper 272. By using the attachments 273, 275 and the shaft 263, it becomes possible to change types of the brake 27 at lower cost since it becomes unnecessary to replace the spindle 280 and/or the slide type constant velocity joint 25 whose replacing costs are relatively high when changing the types of the brake 27 (the disc rotor 271 and the caliper 272).

Figure 14:
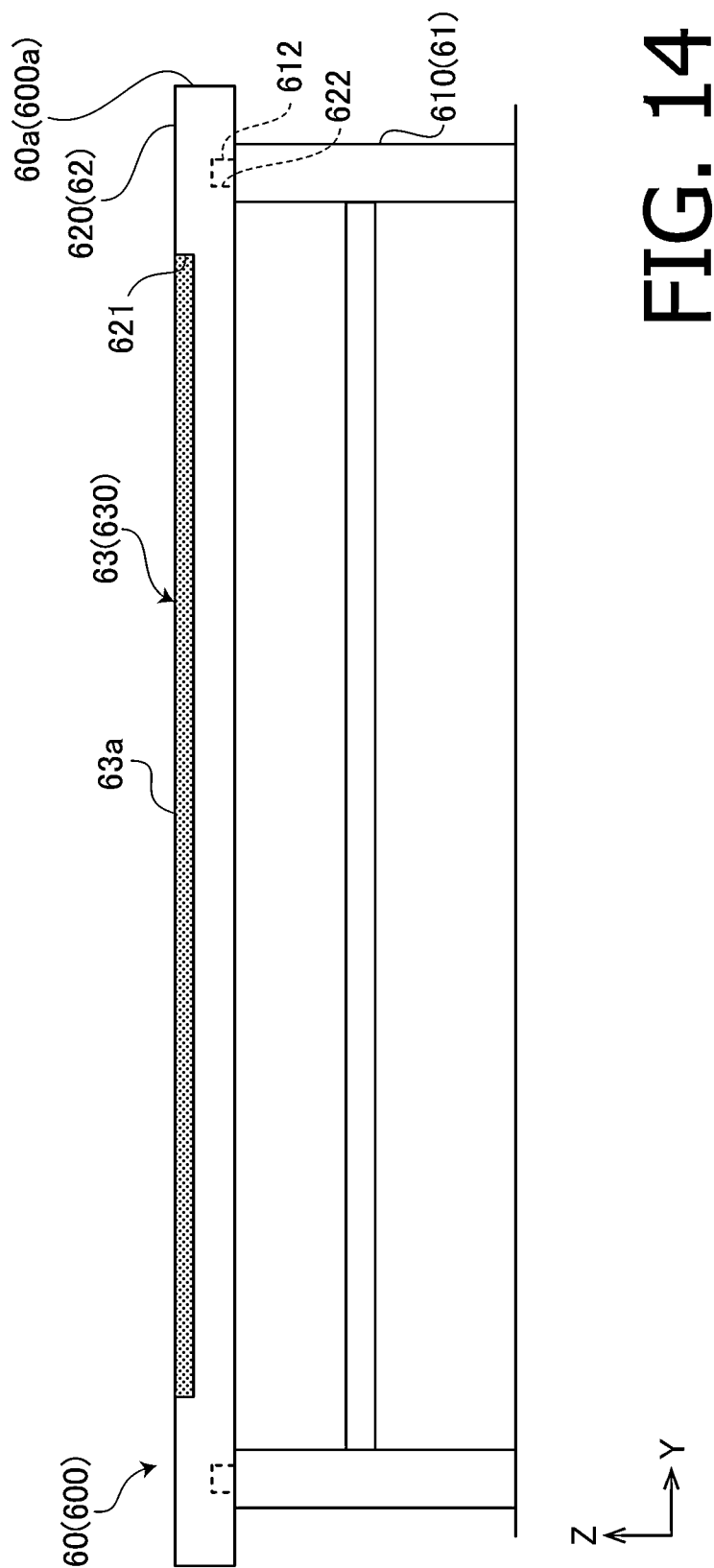
FIG. 14 is a transverse cross-sectional view of a road surface part.

FIG. 14 is a transverse cross-sectional view of the road surface part 60. The road surface part 60 includes the frame 61 and a main body part 60a supported by the frame 61. The main body part 60a includes a base 62 and a pavement part 63 held by the base 62. On an upper surface of the base 62, a recessed part 621 extending in an extending direction of the road surface part 60 (i.e., in the X axis direction being the travelling direction of the carriage 20) is formed. The pavement part 63 is for example formed by filling the recessed part 621 with simulated pavement material which will be described later and hardening the simulated pavement material. On an upper surface of the pavement part 63, the road surface 63a with which the test wheel W contacts is formed.

In the present embodiment, the main body part 60a is configured from main body part units 600a being road surface units (replaceable structures each including at least a portion of the road surface 63a) and is detachably attached on the frame 61. The road surface unit is not limited to a configuration in which the main body part 60a is unitized (hereinafter referred to as a "main body part unit") as in the present embodiment but may be formed to have a configuration in which only the pavement part 63 is unitized (hereinafter referred to as a "pavement part unit") or a configuration in which the entire road surface part 60 including the frame 61 is unitized (hereinafter referred to as a "road surface part unit").

The main body part 60a of the present embodiment is configured from a plurality of the main body part unit 600a formed by dividing the main body part 60a in the extending direction of the road surface part 60 and is configured to be replaceable per the main body part unit 600a. It should be noted that the entire main body part 60a may be formed as a single replaceable road surface unit.

By configuring the road surface part 60 from road surface units such as the main body part units 600a as in the present embodiment, it becomes possible to replace at least a part of the road surface 63a by replacing the road surface unit.

For example, only the main body part unit 600a at the central part of the road surface part 60 in the extending direction (X axis direction) can be replaced to change a type of the pavement part 63 (e.g., materials, structures, surface profiles and the like) only at the central part. Also, the type of the pavement part 63 may be changed for every main body part unit 600a such that, for example, a friction coefficient of the road surface 63a changes in the extending direction of the road surface part 60.

On a lower surface of the base 62, a recessed part 622 that fits with a protruded part 612 provided on an upper surface of the frame 61 is provided. The main body part unit 600a is detachably attached on the frame 61 by placing the main body part unit 600a on the frame 61 such that the protruded part 612 and the recessed part 622 fit to each other and by fixing the main body part unit 600a to the frame 61 with a conventionally-known fixing part such as bolts or cam levers.

In the present embodiment, the frame 61 is formed from a plurality of frame units 610 formed by dividing the frame 61 in its extending direction and is replaceable per the frame unit 610.

In the present embodiment, the frame unit 610 and the main body part unit 600a are formed in the same length and thus replacement per road surface part unit 600 in which the main body part unit 600a is attached to the frame unit 610 is also possible.

In the present embodiment, the pavement part 63 is formed integrally with the base 62. However, the pavement part 63 may be configured to be detachable from and attachable to the base 62. For example, the pavement part 63 may be configured from a plurality of pavement part units 630 formed by dividing the pavement part 63 in its extending direction of the road surface part 60, and may be configured to be replaceable per pavement part unit 630. In this case, the pavement part unit 630 and a base unit 620 may be formed in the same length to make replacement per complex unit in which the pavement part unit 630 is attached to the base unit 620 (in other words, the main body part unit 600a in which the pavement part 63 is made detachable) possible. Also, the frame unit 610, the base unit 620 and the pavement part unit 630 may be assembled to form the road surface part unit 600 to make replacement per road surface part unit 600 possible.

As described above, in the present embodiment, a plurality of road surface part units 600 are connected to form the road surface part 60. By this configuration, it is possible to extend or shorten the road surface part 60 by adding or removing the road surface part unit 600. Furthermore, by configuring the plurality of road surface units to have the same structure, it becomes possible to efficiently manufacture the road surface part 60.

In the present embodiment, as with the road surface part 60, the track part 10 is divided into a plurality of track part units 100 in its extending direction. It is also possible to extend or shorten the track part 10 by adding or removing the track part unit 100. The track part unit 100 is formed in the same length as the road surface part unit 600. Therefore, it is possible to form the track part 10 and the road surface part 60 in the same length. The road surface part 60 and the track part 10 may also be configured to be possible to extend, shorten or partially replace per complex unit in which the track part unit 100 and the road surface part unit 600 are integrated.

In the road surface part 60 of the present embodiment, a simulated pavement simulating asphalt-paved road (i.e., a pavement of which influences on a tire such as wear volume of a tire are comparable with the actual asphalt-paved road) is formed as the pavement part 63. The simulated pavement is for example formed by shaping and curing simulated pavement material in which binder such as, for example, urethane resin or epoxy resin is added to aggregate formed by crushing (and further polishing and/or etching as necessary) ceramics with excellent wear resistance such as silicon carbide or alumina. By using such simulated pavement material, a simulated road surface with excellent wear resistance and stable road surface state (i.e., a simulated road surface that causes stable wear volume and the like to the test tire T) can be obtained. The wear volume of a tire can be adjusted by, for example, particle size of the aggregate and/or amount of the binder added.

The simulated pavement of the present embodiment has a single-layered structure. However, for example, a simulated pavement in which a plurality of layers formed from different materials are layered in a thickness direction may be used. Simulated pavements simulating flagstone pavements, brick pavement, concrete pavement and the like by, for example, adjusting types and/or particle size of the aggregate and/or adjusting types and/or amount of the binder may also be used.

The road surface 63a may also be formed to cause more (or less) damage on a tire than the actual road surface. It becomes possible to perform accelerated tire deterioration test by using the road surface 63a which has greater influence on a tire than the actual road surface.

The pavement part 63 may also be formed from actual pavement material (e.g., asphalt compound used for a superficial layer of an asphalt pavement). The pavement part 63 replicating or imitating not only a superficial layer of an actual pavement forming the road surface but also a lower layer structure of the actual pavement may also be used.

In the tire testing device 1 of the present embodiment, since the road surface 63a does not move during the test, the test can be performed in a state where foreign matter (e.g., water, snow, mud water, dirt, sand, gravel, oil or the like or matter simulating the aforementioned foreign matter) which has influence on performance of a tire is scattered on the road surface 63a. For example, by performing the test in a state where water is scattered on the road surface 63a, wet braking test can be performed.

Figure 15:
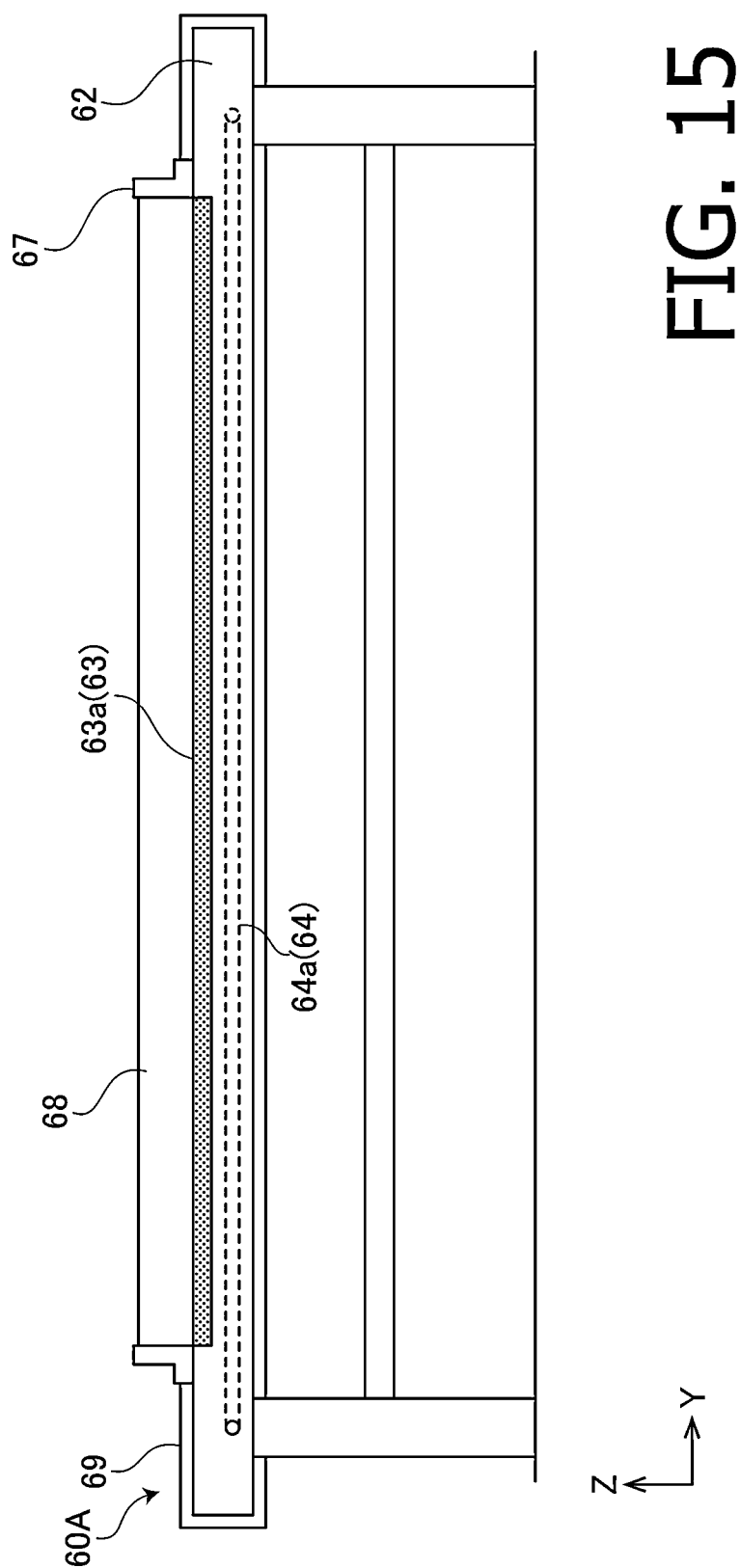
FIG. 15 is a transverse cross-sectional view of a variation of the road surface part.

A variation of the road surface part 60 will be described. FIG. 15 is a transverse cross-sectional view of a road surface part 60A being a variation of the road surface part 60. The road surface part 60A includes a frame part 67 attached to the base 62. The frame part 67 is bonded to the base 62 to be watertight by caulking or the like and forms a basin 68 together with the base 62 and the pavement part 63. Foreign matter (e.g., water, gravel, dirt, fallen leaves or the like) having influence on performance of a tire is put in the basin 68 to cover the road surface 63a. By using the basin 68, it becomes possible to thickly deposit foreign matter on the road surface 63a. The frame part 67 of this variation is attached on an upper surface of the base 62, but the frame part 67 may be attached on side faces of the base 62. The frame part 67 may also be attached on an upper surface of the pavement part 63.

The road surface part 60A includes a temperature adjusting unit 64 configured to be capable of adjusting temperature of the road surface 63a. The temperature adjusting unit 64 of the present variation has a flow channel 64a embedded in the base 62, a temperature sensor 64b configured to detect temperature of the road surface 63a, and a temperature adjusting device 64c (FIG. 27). The temperature sensor 64b is, for example, a contact type temperature sensor which uses a thermocouple, a thermistor or the like or a noncontact type temperature sensor such as an infrared sensor. The temperature adjusting device 64c is connected to the control part 72 and adjusts the temperature of the road surface 63a to a set temperature based on a command from the control part 72. Specifically, the temperature adjusting device 64c adjusts temperature of heat carrier (e.g., oil or water containing antifreeze liquid) based on detection result by the temperature sensor 64b and transmits the heat carrier to the flow channel 64a. It is possible to adjust the temperature of the road surface 63a to a predetermined temperature by causing the heat carrier of which temperature is adjusted by the temperature adjusting device to flow through the flow channel 64a. An outer surface of the base 62 is coated with heat insulating material 69 to stabilize the temperature of the road surface 63a and to improve heat use efficiency.

The temperature adjusting unit 64 can adjust the temperature of the road surface 63a in a wide range from a low temperature (e.g., −40 degrees Celsius) up to a high temperature (e.g., 80 degrees Celsius). It is possible to form a frozen road surface by filling the basin 68 with water and setting the set temperature of the road surface 63a to below zero. That is, it is possible to perform ice braking test by using the road surface part 60A of the present variation. It is also possible to perform snow braking test in a state where the basin 68 is filled with snow.

The flow channel 64a is formed to meander at constant intervals within the base 62 in parallel with the road surface 63a. The base 62 is segmented into a plurality of sections (the base units 620) in its lengthwise direction and respective flow channels 64a are formed to respective sections. By this configuration, it becomes possible to adjust the temperature of the entire road surface 63a more evenly.

Next, the load detecting part 165 will be described. the load detecting part 165 is a configuration that is capable to detect the distribution of the load that act on the tire tread.

Figure 16:
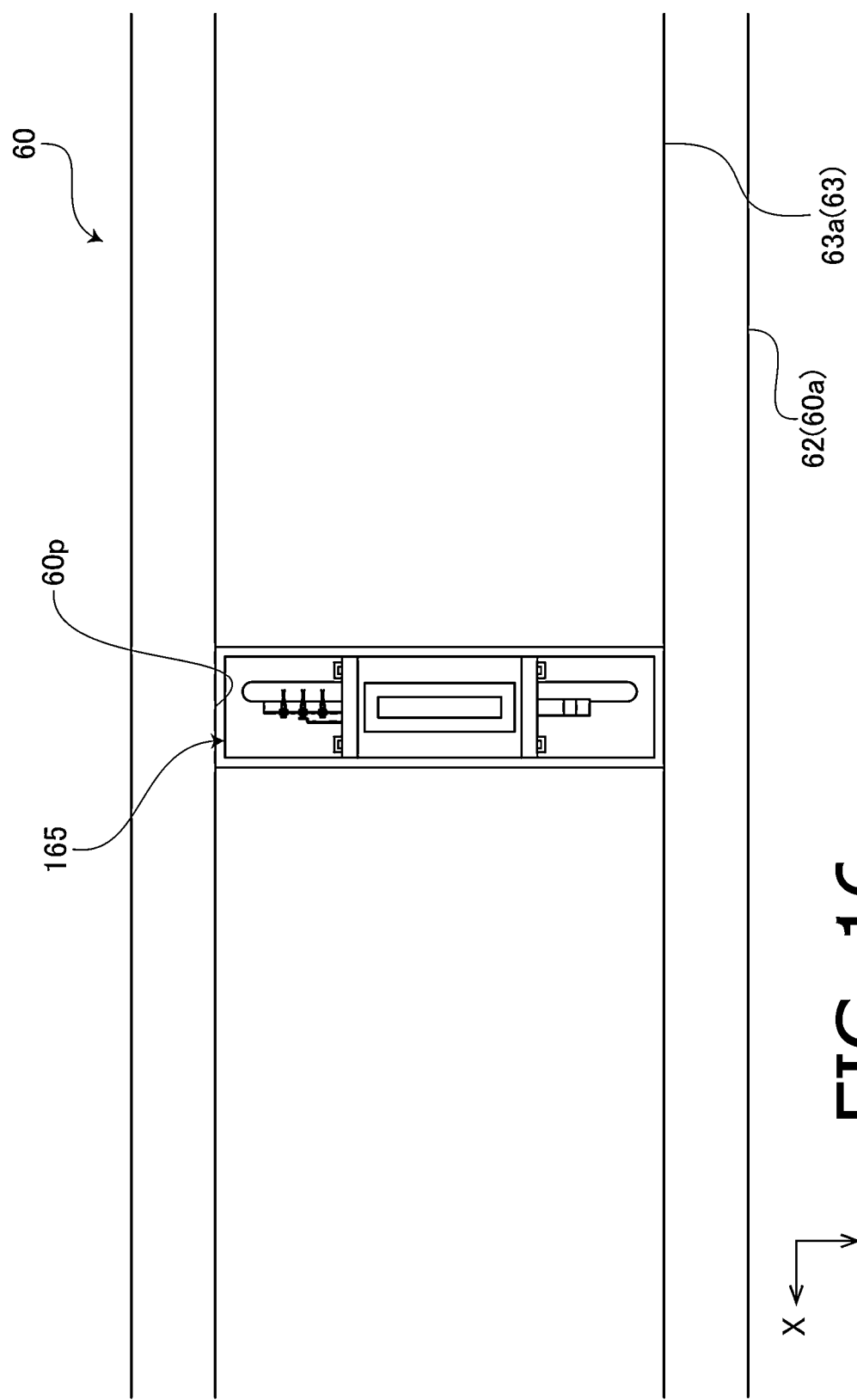
FIG. 16 is a plan view of the road surface part around a load detecting part.
Figure 17:
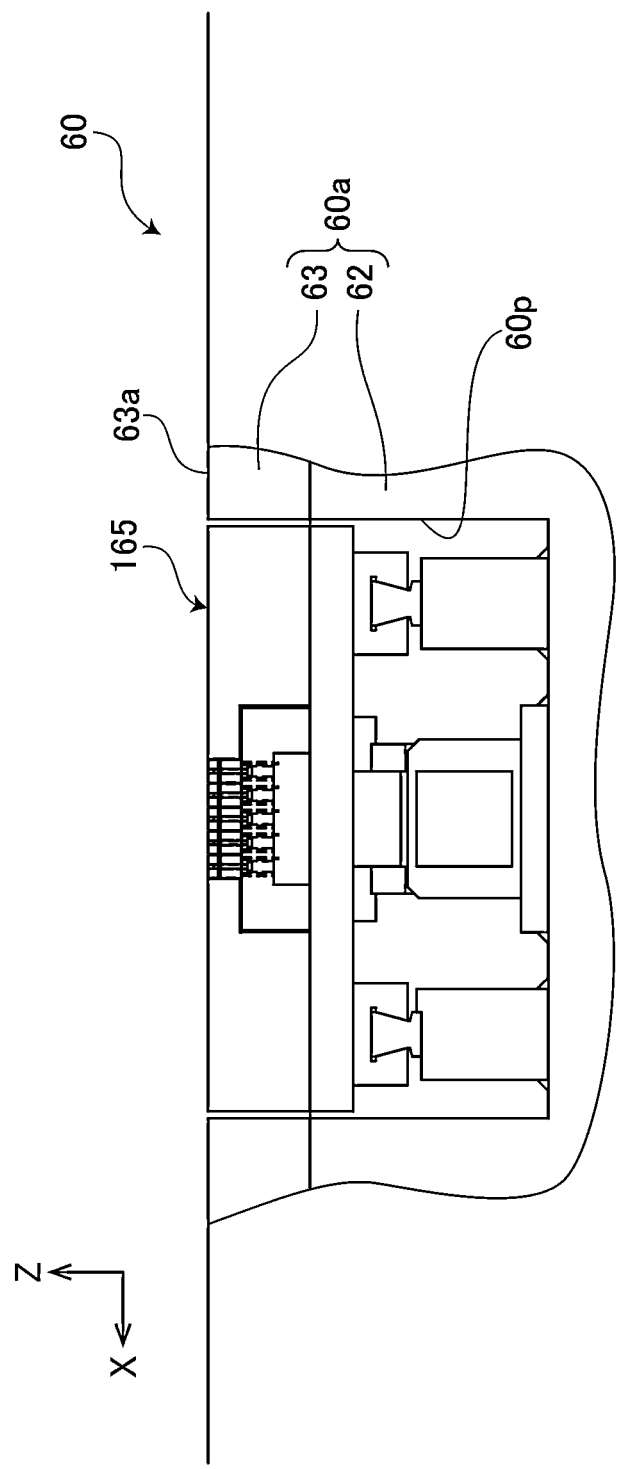
FIG. 17 is a side view of the road surface part around the load detecting part.
Figure 18:
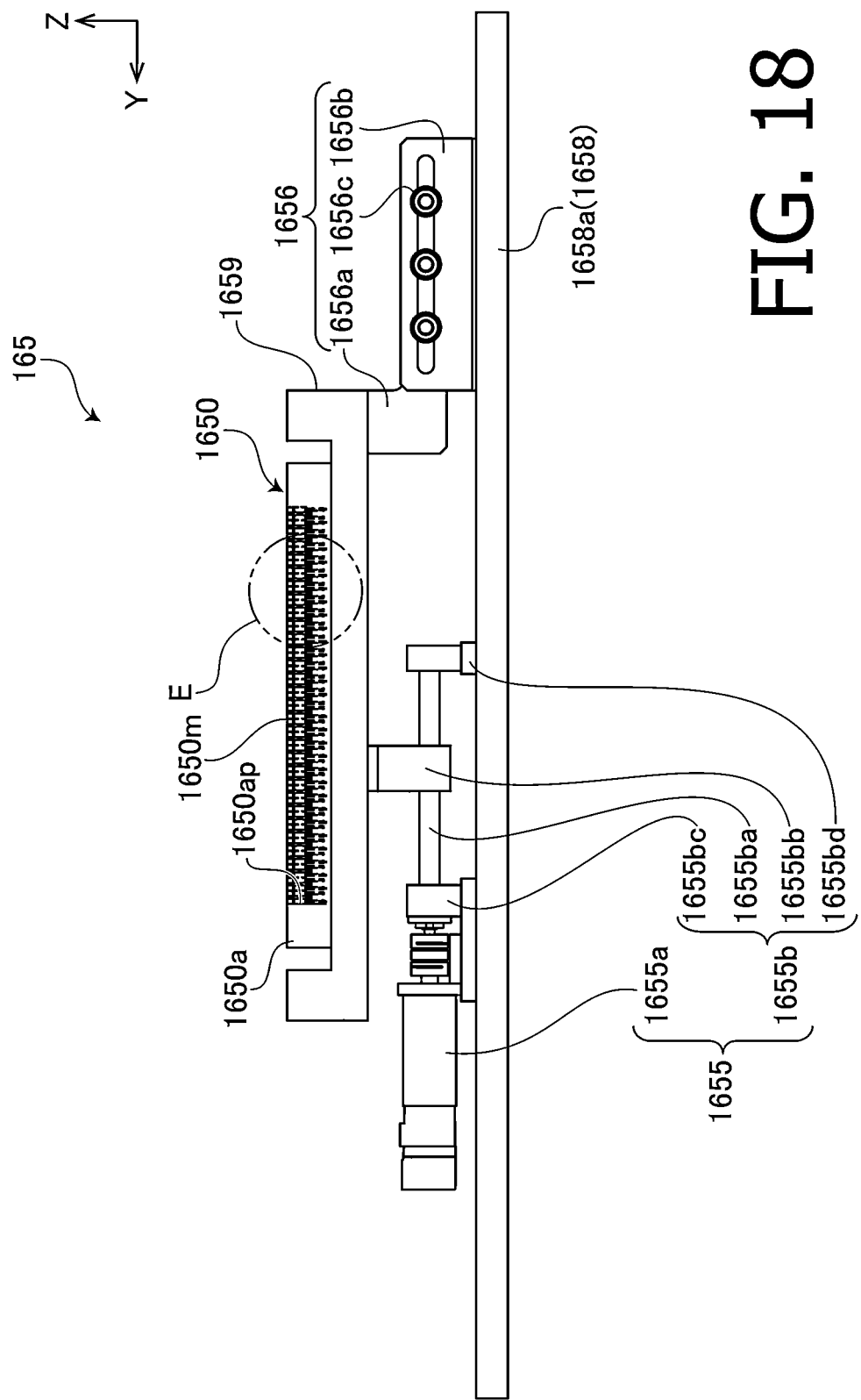
FIG. 18 is a front view of the load detecting part.
Figure 19:
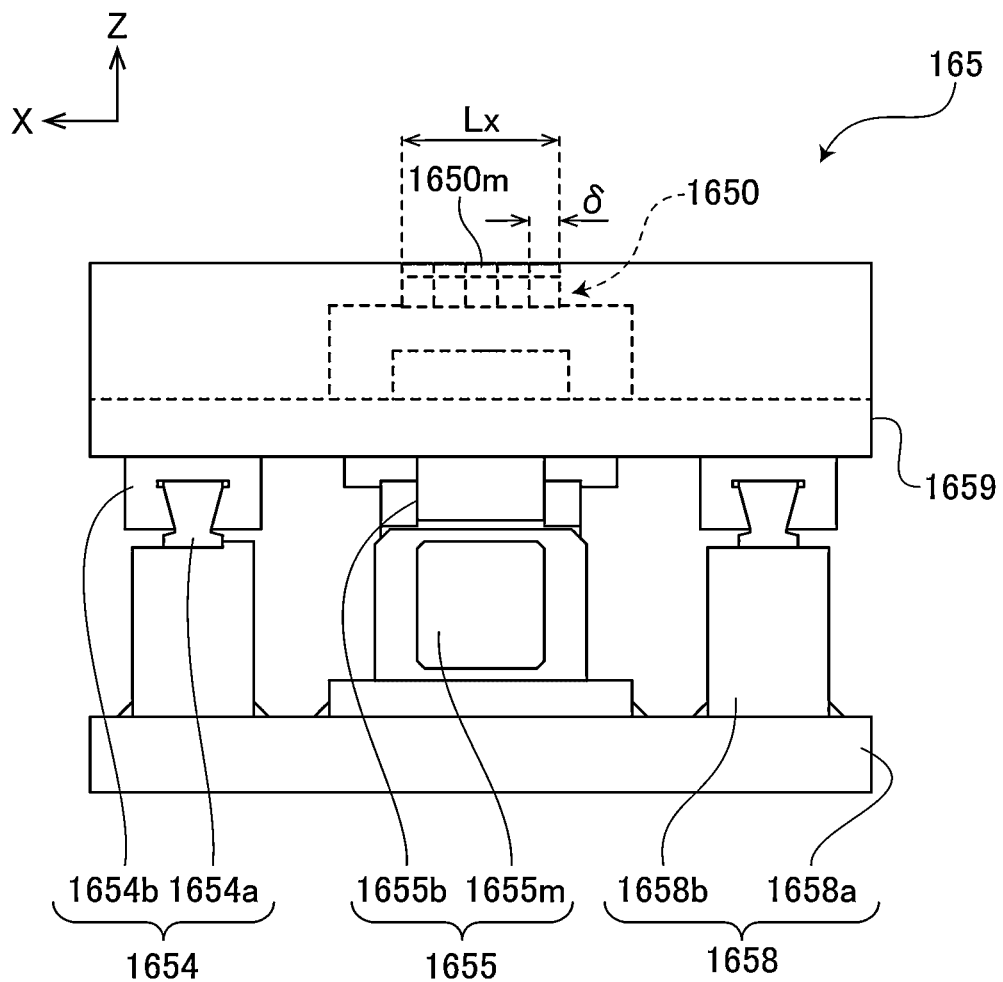
FIG. 19 is a side view of the load detecting part.
Figure 20:
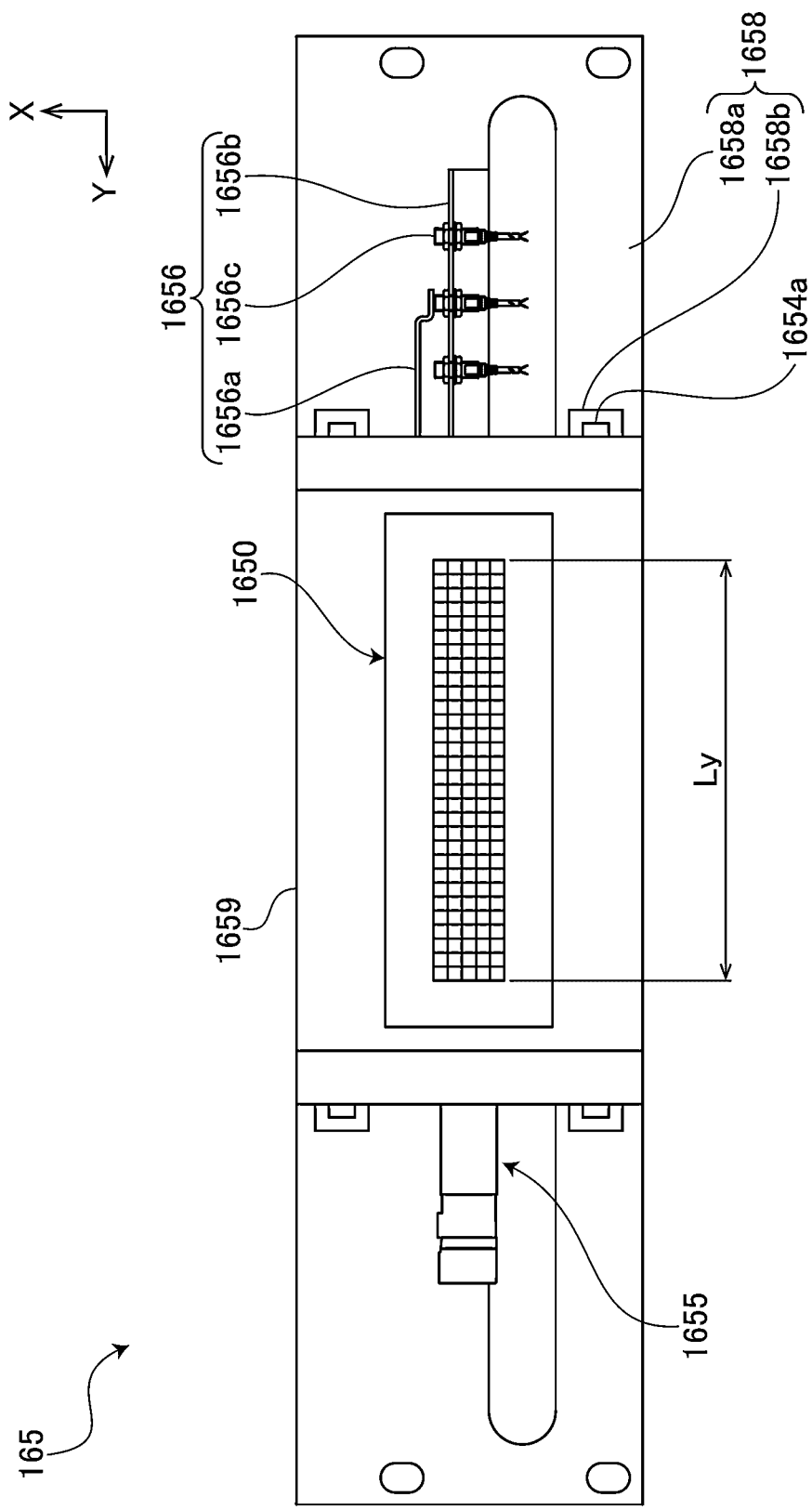
FIG. 20 is a plan view of the load detecting part.

FIGS. 16 and 17 are a plan view and a left side view of and around the load detecting part 165 of the road surface part 60, respectively. FIGS. 18, 19 and 20 are a front view, a left side view and a plan view of the load detecting part 165, respectively.

As shown in FIGS. 16 and 17, on an upper surface of the main body part 60a of the road surface part 60, a recessed part 60p elongated in the Y axis direction is formed. The load detecting part 165 is accommodated inside the recessed part 60p and is fixed to the bottom of the recessed part 60p.

As shown in FIGS. 18 to 20, the load detecting part 165 includes a fixed frame 1658, a movable frame 1659, a pair of linear guides 1654, a sensor array unit 1650, a moving unit 1655, and a sensor position detecting part 1656. In FIG. 18, the linear guides 1654 and rail supporting parts 1658b of the fixed frame 1658 which will be described later are omitted. The movable frame 1659 is supported by the pair of linear guides 1654 to be movable in the Y axis direction (i.e., in a widthwise direction of the road surface part 60). The sensor array unit 1650 is attached on an upper surface of the movable frame 1659. Details of the sensor array unit 1650 will be described later.

Figure 21:
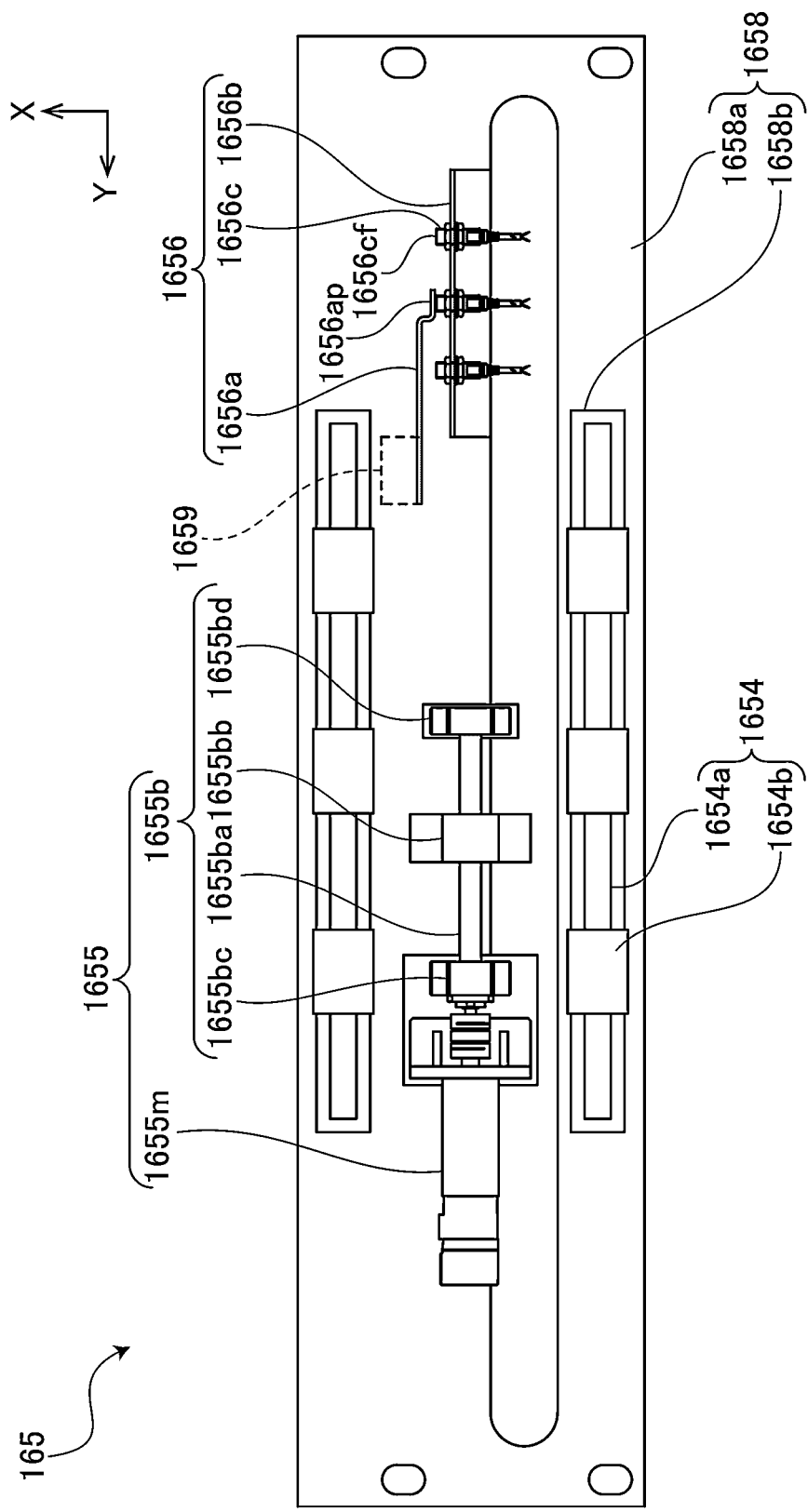
FIG. 21 is a plan view showing a state where a movable part of the load detecting part is removed.

FIG. 21 is a plan view showing the load detecting part 165 in a state where the movable part (i.e., the movable frame 1659 and the sensor array unit 1650) is removed.

As shown in FIGS. 19 and 21, the fixed frame 1658 includes a substantially rectangular base plate 1658a, and a pair of rail supporting parts 1658b fixed on an upper surface of the base plate 1658a. The pair of rail supporting parts 1658b are arranged in the X axis direction with an interval therebetween while orienting their lengthwise directions in the Y axis direction.

The linear guide 1654 includes a rail 1654a extending in the Y axis direction, and a plurality of (in the present embodiment, three) carriages 1654b (hereinafter referred to as "runners 1654b") capable of travelling on the rail 1654a. The rail 1654a is attached on an upper surface of the rail supporting part 1658b. The runners 1654b are attached on a lower surface of the movable frame 1659. The movement of the movable frame 1659 in the Y axis direction is guided by the linear guides 1654.

The moving unit 1655 is arranged between the pair of rail supporting parts 1658b and the linear guides 1654. The moving unit 1655 includes a servo motor 1655m and a ball screw mechanism 1655b. The ball screw mechanism 1655b includes a ball screw 1655ba, a nut 165bb, a bearing part 1655bc, and a bearing part 1655bd.

The ball screw 1655ba is rotatably supported by a pair of the bearing parts 1655bc and 1655bd at both ends of the ball screw 1655ba. One end of the ball screw 1655ba is connected to a shaft of the servo motor 1655m. The nut 1655bb engaging with the ball screw 1655ba is attached on the lower surface of the movable frame 1659. As the ball screw 1655ba is rotated by the servo motor 1655m, the movable frame 1659 and the sensor array unit 1650 moves in the Y axis direction together with the nut 1655bb. That is, a position of the sensor array unit 1650 in the Y axis direction can be changed by rotationally driving the servo motor 1655m.

As shown in FIG. 21, the sensor position detecting part 1656 includes a movable arm 1656a, a plurality of (in the present embodiment, three) proximity sensors 1656c, and a sensor attaching part 1656b. An end portion of the movable arm 1656a is fixed to the movable frame 1659 and the movable arm 1656a is movable in the Y axis direction together with the movable frame 1659. The sensor attaching part 1656b is attached to the fixed frame 1658.

The plurality of proximity sensors 1656c are arranged in the Y axis direction with intervals (e.g., at constant intervals) while orienting their detecting surfaces 1656cf in the X axis positive direction, and are attached to the sensor attaching part.

At a tip portion of the movable arm 1656a, a proximity part 1656ap adjacent to the proximity sensors 1656c are formed. In the present embodiment, the proximity part 1656ap is formed by bending the tip portion of the movable arm 1656a in a crank shape. The proximity part 1656ap is disposed at the same height as the detecting surfaces 1656cf of the plurality of proximity sensors 1656c. The detecting surfaces 1656cf of the plurality of proximity sensors 1656c are arranged within a movable range of the proximity part 1656ap in the Y axis direction with intervals therebetween.

Figure 22:
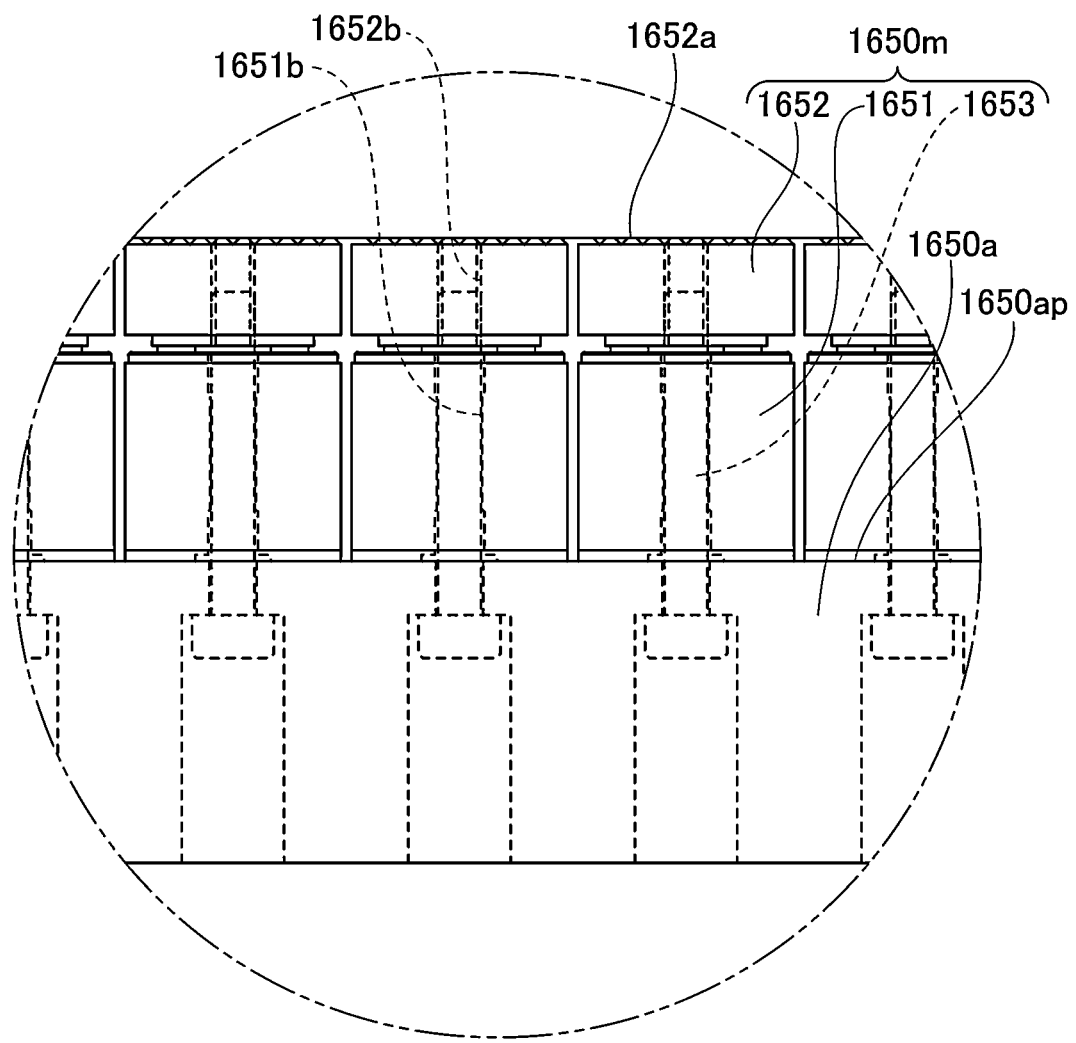
FIG. 22 is an enlarged view of an area E shown in FIG. 18.

FIG. 22 is an enlarged view of an area E surrounded by a chain double-dashed line in FIG. 18. As shown in FIGS. 18 and 22, the sensor array unit 1650 includes a frame 1650a and a plurality of (in the present embodiment, 150) load detecting modules 1650m. At the central part of an upper surface of the frame 1650a, a recessed part 1650ap long in the Y axis direction is formed. The plurality of load detecting modules 1650m are accommodated in the recessed part 1650ap and are fixed to the bottom of the recessed part 1650ap.

The plurality of load detecting modules 1650m are arranged in the X axis direction and the Y axis direction at lattice points at constant intervals (e.g., with substantially no gap therebetween). In the present embodiment, 150 load detecting modules 1650m are arranged in 5 rows in the X axis direction and 30 rows in the Y axis direction.

The load detecting module 1650m includes a three force components sensor 1651, a pavement part 1652, and a bolt 1653. The three force components sensor 1651 is a columnar piezoelectric element whose center axis is oriented in the Z axis direction. The pavement part 1652 is, for example, a rectangular parallelepiped member formed of the simulated pavement material or pavement material that is the same as the pavement part 63 and having the same length in the X axis direction and the Y axis direction. The shapes of the three force components sensor 1651 and the pavement part 1652 are not limited to these shapes. For example, the three force components sensor 1651 may have a rectangular parallelepiped shape, and the pavement part 1652 may have a columnar shape.

At the center of the cylindrical three force components sensor 1651, a hole 1651b penetrating in the Z axis direction is formed. At the center of the pavement part 1652, a bolt hole 1652b extending in the Z axis direction is formed. The load detecting module 1650*m* is integrated and fixed to the frame 1650*a* by the bolt 1653 inserted through the hole 1651*b* of the three force components sensor 1651 and screwed in the bolt hole 1652*b* of the pavement part 1652. Upper surfaces of the pavement parts 1652 are disposed horizontally at the same height to form a road surface 1652*a*. An area in the X axis direction and the Y axis direction where the load detecting modules 1650*m* are arranged is a detecting area of the sensor array unit 1650.

Temporal changes of the following three forces $f_R$, $f_T$ and $f_L$ that act on the road surface 1652*a* of each load detecting module 1650*m* (i.e., on the tire tread) are detected by the three force components sensor 1651.

a) radial force $f_R$
b) tangential force $f_T$
c) lateral force $f_L$

It is possible to detect distribution and temporal change of force that the road surface receives from the tire tread of the test tire T (i.e., force that acts on the tire tread) by using the load detecting part 165.

FIG. 27 is a block diagram showing a schematic configuration of a control system 1*a* of the tire testing device 1. The control system 1*a* includes a control part 72 configured to control operation of the entire device, a measuring part 74 configured to perform various measurements, and an interface part 76 configured for input from and output to outside.

The control part 72 includes a CPU, a ROM, and/or a RAM. To the control part 72, the servo motors 141 of respective drive parts 14, the servo motor 32 of the torque applying device 30, the servo motor 451 of the load adjusting part 45, the servo motor 461 of the slip angle adjusting part 46, the servo motor 1655*m* of the moving unit 1655 and the servo motor 276*b* of the hydraulic pressure supplying device 276 are connected via servo amplifiers 141*a*, 32*a*, 451*a*, 461*a*, 1655*a* and 276*a*, respectively.

The control part 72 and respective servo amplifiers 141*a*, 276*a*, 32*a*, 451*a* and 461*a* are communicably connected to each other with optical fibers and it is made possible to perform high-speed feedback control between the control part 72 and respective servo amplifiers. It is thereby made possible to perform synchronized control with high precision (with high resolution and high accuracy in the time axis).

Also, the temperature adjusting device 64*c* is connected to the control part 72.

The six force components sensor 282 of the spindle part 28, the three force components sensor 1651 of the load detecting part 165 and the proximity sensor 1656*c* of the sensor position detecting part 1656 are connected to the measuring part 74 via preamplifiers 282*a*, 1651*a* and 1656*ca*, respectively. Signals from the six force components sensor 282, the three force components sensors 1651 and the proximity sensors 1656*c* are amplified by preamplifiers 282*a*, 1651*a* and 1656*ca*, respectively, and then converted into digital signals in the measuring part 74, thereby measurement data is generated. The measurement data is input to the control part 72. In FIG. 27, only one three force components sensor 1651, one preamplifier 1651*a*, one proximity sensor 1656*c* and one preamplifier 1656*ca* are shown.

Pieces of phase information detected by built-in rotary encoders RE of respective servo motors 141, 32, 451, 461, 1655*m* and 276*b* are input to the control part 72 via respective servo amplifiers 141*a*, 32*a*, 451*a*, 461*a*, 1655*a* and 276*a*.

The interface part 76 includes, for example, one or more of a user interface for input by and output to a user, a network interface for connection to various types of network such as a LAN (Local Area Network), and various types of communication interfaces such as a USB (Universal Serial Bus) and a GPIB (General Purpose Interface Bus) for connection to external devices. The user interface includes, for example, one or more of various types of operation switches, indicators, various types of display devices such as an LCD (Liquid Crystal Display), various types of pointing devices such as a mouse and a touch panel, and various types of input/output devices such as a touch screen, a video camera, a printer, a scanner, a buzzer, a speaker, a microphone and a memory card reader/writer.

The control part 72 can cause the carriage 20 to travel in a predetermined speed by synchronously controlling driving of the servo motors 141 of respective drive parts 14 based on setting data of speed that is input through the interface part 76. In the present embodiment, all the four drive parts 14 are driven in the same phase (more precisely, the drive parts 14LA and 14LB on the left and the drive parts 14RA and 14RB on the right are driven in opposite phases [in opposite rotating directions]).

The control part 72 can apply a predetermined longitudinal force to the test tire T by controlling driving of the servo motor 32 of the torque applying device 30 based on setting data of the longitudinal force (braking force or driving force) to be applied to the test tire T obtained through the interface part 76. The control part 72 can also apply a predetermined torque to the test wheel W by controlling the torque applying device 30 based on setting data of torque (or setting data of acceleration) in place of the setting data of the longitudinal force.

The control part 72 can execute the control of the drive part 14 for causing the carriage 20 to travel in a predetermined travelling speed (and, at the same time, causing the test tire T to rotate in a peripheral speed that is substantially the same as the travelling speed) and the control of the torque applying device 30 for applying the longitudinal force (or the torque) to the test tire T synchronously based on a synchronizing signal.

Aside from basic waveforms such as sine wave, half sine wave, sawtooth wave, triangle wave and trapezoid wave, longitudinal force (or torque) waveforms that are measured in on-road tests, longitudinal force (or torque) waveforms that are obtained through simulated calculations, or other arbitrary synthesized waveforms (e.g., waveforms that are generated by a function generator or the like) can be used as waveforms of the torque to be generated by the torque applying device 30.

Similarly, with regard to the control of the travelling speed of the carriage 20 (or the rotating speed of the test wheel W), aside from the basic waveforms, waveforms of rotating speeds of wheels that are measured in on-road tests, waveforms of change of speed that are obtained through simulated calculations, or other arbitrary synthesized waveforms (e.g., waveforms that are generated by a function generator or the like) can be used.

Next, a procedure for changing the position of the sensor array unit 1650 in the Y axis direction with the moving unit 1655 will be described. In an initial state shown in FIG. 21, the sensor array unit 1650 is disposed at a position where the proximity part 1656*ap* of the movable arm 1656*a* opposes the detecting surface 1656*cf* of the proximity sensor 1656*c* positioned at the center. As an instruction to move the sensor array unit 1650 to the left (in the Y axis positive direction) is provided through, for example, a user operation on a touch screen, the control part 72 transmits a command for an anti-clockwise rotation to the servo amplifier 1655*a* to move the sensor array unit 1650 in the Y axis direction. The servo amplifier 1655*a* which received the command for the anti-clockwise rotation supplies driving current that causes the servo motor 1655*m* to rotate in the anti-clockwise direction. As the servo motor 1655*m* is driven in the anti-clockwise direction by the drive current, the ball screw 1655*ba* rotates in the anti-clockwise direction together with the shaft of the servo motor 1655*m*, and the sensor array unit 1650 moves in the Y axis direction together with the nut 1655*bb* and the movable frame 1659.

As the sensor array unit 1650 moves in the Y axis direction, the proximity part 1656*ap* of the movable arm 1656*a* moves away from the detecting surface 16556*cf* of the proximity sensor 1656*c* at the center and the proximity sensor 1656*c* at the center becomes less responsive to proximation. In time, the proximity part 1656*ap* of the movable arm 1656*a* reaches a position opposing the detecting surface 1656*cf* of the proximity sensor 1656*c* on the left (on the Y axis positive direction side). At this time, the proximity sensor 1656*c* on the left detects proximation and outputs a proximation signal indicating detection of proximation. The measuring part 74 which received the proximation signal through the pre-amplifier 1656*ca* notifies the control part 72 that the sensor array unit 1650 reached a fixed position on the left. The control part 72 which received the notification from the measuring part 74 transmits a command to stop driving to the servo amplifier 1655*a*. The servo amplifier 1655*a* which received the command to stop driving stops supplying driving current to the servo motor 1655*m*. The rotations of the shaft of the servo motor 1655*m* and the ball screw 1655*ba* thereby stop and the nut 1655*bb* and the sensor array unit 1650 also stop, and the displacement of the sensor array unit 1650 completes.

By providing the moving unit 1655, it becomes possible to shorten a length Ly (FIG. 20) of the detecting area of the sensor array unit 1650 in the Y axis direction to reduce the number of load detecting modules 1650*m* necessary to measure the load distribution, and thus it becomes possible to reduce cost necessary to manufacture and maintain the sensor array unit 1650.

Figure 23:
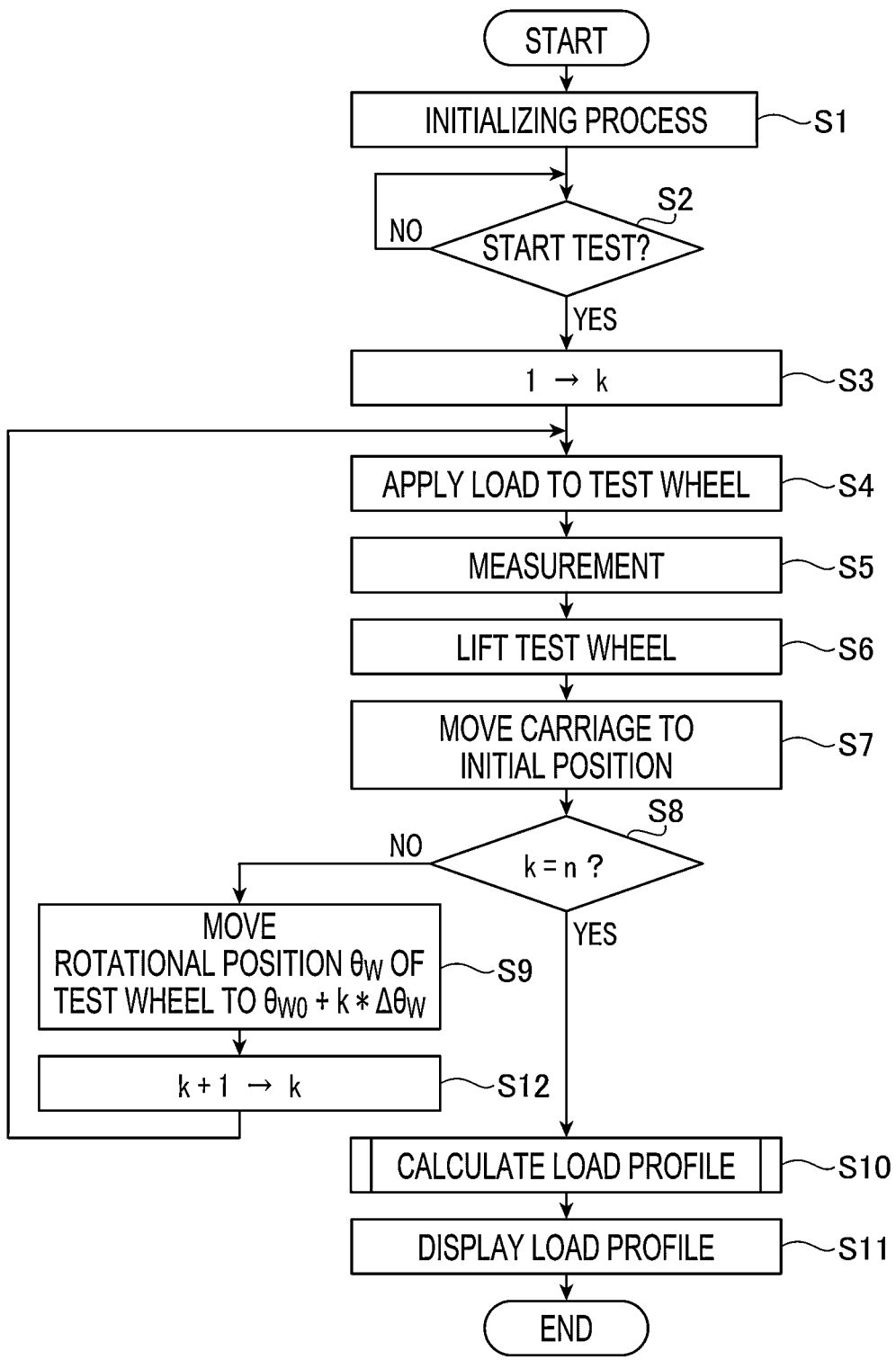
FIG. 23 is a flowchart showing a procedure for obtaining distribution of load acting on a tire tread.

Next, a method for obtaining distribution of load acting on the tire tread by using the load detecting part 165 will be described. FIG. 23 is a flowchart showing a procedure of the method for obtaining distribution of load acting on the tire tread.

As the power of the tire testing device 1 is switched on, the control part 72 firstly execute an initializing process S1. As shown in FIG. 2, in an initial state, the carriage 20 is positioned at an initial position (an initial travelling position) $P_{X0}$ being set at a position near an end of its movable range in the X axis minus direction. The slide frame 44 (FIG. 4) is positioned at an initial position $P_{Z0}$ being set for example at a position near an upper end of its movable range. At the initial position $P_{Z0}$, the test wheel W is lifted off the road surface 63*a* and it is possible to attach and detach the test wheel W and to adjust alignment of the test wheel W. The slip angle and the camber are also adjusted to set values by the slip angle adjusting part 46 and the camber adjusting part 47, respectively.

In the state where the test wheel W is lifted off the road surface 63*a*, the servo motor 32 of the torque applying device 30 is driven and a rotational position $\theta_W$ of the test wheel W is moved to an initial rotational position $\theta_{W0}$ to complete the initializing process S1. A rotational position $\theta_H$ of the torque applying device 30 (i.e., the housing 31) depends on a travelling position $P_X$ of the carriage 20. In the initial state, the torque applying device 30 is always positioned at an initial rotational position $\theta_{H0}$.

After completion of the initializing process S1, as an instruction to start the test is provided through, for example, a user operation on a touch screen (S2: YES), a number of measurement sets k being a counter is reset to 1 (S3), and the test wheel W is made to descend and contact the road surface 63*a* and a set load is applied to the test wheel W by the load adjusting part 45 (S4).

Then, the first measurement set S5 is executed. In the measurement set S5, the servo motors 141 of respective drive parts 14 are driven, and the carriage 20 travels at a set travelling speed and the test wheel W rotates at a peripheral speed that is substantially the same as the travelling speed of the carriage 20. The servo motor 32 of the torque applying device 30 is also driven and a set torque is applied to the test wheel W.

In the measurement set S5, forces acting on the road surface 1652*a* and the test wheel W are detected by the three force components sensor 1651 of the load detecting part 165 and the six force components sensor 282 of the spindle part 28, respectively, at predetermined time intervals (e.g., at 5 msec intervals). The time intervals of the detections by the three force components sensor 1651 and the six force components sensor 282 are appropriately set in accordance with test conditions (e.g., the travelling speed of the carriage 20 and required test accuracy).

In the measurement set S5, the travelling position $P_X$ of the carriage 20 and the rotational position $\theta_W$ of the test wheel W are calculated at predetermined time intervals (e.g., at time intervals that is the same as those for the detection by the three force components sensor 1651). The travelling position $P_X$ of the carriage 20 is calculated from detection results by the built-in rotary encoders RE (FIG. 10) of the servo motors 141 of the drive parts 14, reduction ratios of the reducers 142 and pitch diameters of the drive pulleys 52 of the belt mechanisms 50. In the description of the present embodiment, the travelling position $P_X$ of the carriage 20 is defined as a position of the rotation axis Ay of the test wheel W in the travelling direction of the carriage 20 (in the X axis direction).

The rotational position $\theta_W$ of the test wheel W is calculated based on detection results by the rotary encoder 39 of the torque applying device 30 and the built-in rotary encoder RE of the servo motor 32. Specifically, the rotational position $\theta_W$ of the test wheel W is calculated by adding the product of the rotational position $\theta_M$ of the shaft 321 of the servo motor 32 detected by the rotary encoder RE of the servo motor 32 (the initial rotational position $\theta_{M0}$ in the initial state being 0 [rad]) and a reduction ratio of the reducer 33 (i.e., a rotational position $\theta_S$ of the shaft 34 with respect to the housing 31) to a rotational position $\theta_H$ of the housing 31 of the torque applying device 30 detected by the rotary encoder 39.

It should be noted that a detecting unit such as a rotary encoder for detecting a rotational position $\theta_T$ of an output from the torque applying device 30 (e.g., a rotational position of the spindle 280, the shaft 261 or the shaft 263) may be provided to detect the rotational position $\theta_W$ of the test wheel W directly with the detecting unit.

The detection results by the three force components sensor 1651 and the six force components sensor 282 are associated with the detection results by the built-in rotary encoders RE of the servo motors 141 of the drive parts 14 (i.e., the travelling position $P_X$ of the carriage 20) and the detection result of the rotational position $\theta_W$ of the test wheel W that are detected at the same timing and are stored in the storage device 721 of the control part 72 (or in a storing unit that the control part 72 can access such as the server 77 connected to the control part 72 via for example a LAN). Regarding the detection result by the three force components sensor 1651, only the result within a time period in which the test wheel W passes over the sensor array unit 1650 and the results within predetermined time periods before and after the aforementioned time period may be stored. With this configuration, it is possible to reduce an amount of data to be stored.

As the carriage 20 reaches a dead end of a travelling zone and stops, the test wheel W is lifted by the load adjusting part 45 to a height at which the test wheel W is lifted off the road surface 63*a* (e.g., the same height as the initial state) (S6). Then, the drive parts 14 are driven to move the carriage 20 to the initial position $P_{X0}$ (S7).

The above-described processes S4 to S9 are repeated until the number of measurement sets k reaches a preset number n (S8). If the number of measurement sets k has not yet reached the preset number n (S8: NO), the servo motor 32 of the torque applying device 30 is driven to move the rotational position $\theta_W$ of the test wheel W to a rotational position $\theta_{W0}+k*\Delta\theta_W$ (S9) and the counter k is incremented (S12). That is, the rotational position $\theta_W$ of the test wheel W at the initial position $P_{X0}$ is changed by an angular width $\Delta\theta_W$ each time the number of measurement sets k increases by one.

The angular width $\Delta\theta_W$ is, for example, set to a value that is equal to or less than a central angle $\theta_{C1}$ of the test wheel W corresponding to a length Lx (FIG. 19) of the detecting area of the sensor array unit 1650 in the X axis direction (i.e., a rotation angle $\theta_{C1}$ of the test wheel W when the test wheel W rolls for a distance Lx). For example, the angular width $\Delta\theta_W$ is set to a value that is the same as or slightly smaller than a central angle $\theta_{C2}$ of the test wheel W corresponding to an arrangement interval δ (FIG. 19) of the load detecting modules 1650*m*.

Also, the angular width $\Delta\theta_W$ may for example be set to a value obtained by dividing 2π by the preset number n. In this case, the entire circumference of the test wheel W is measured without gap by the n measurement sets.

After completion of the preset n measurement sets (S8: YES), a load profile calculation S10 is executed.

Figure 24:
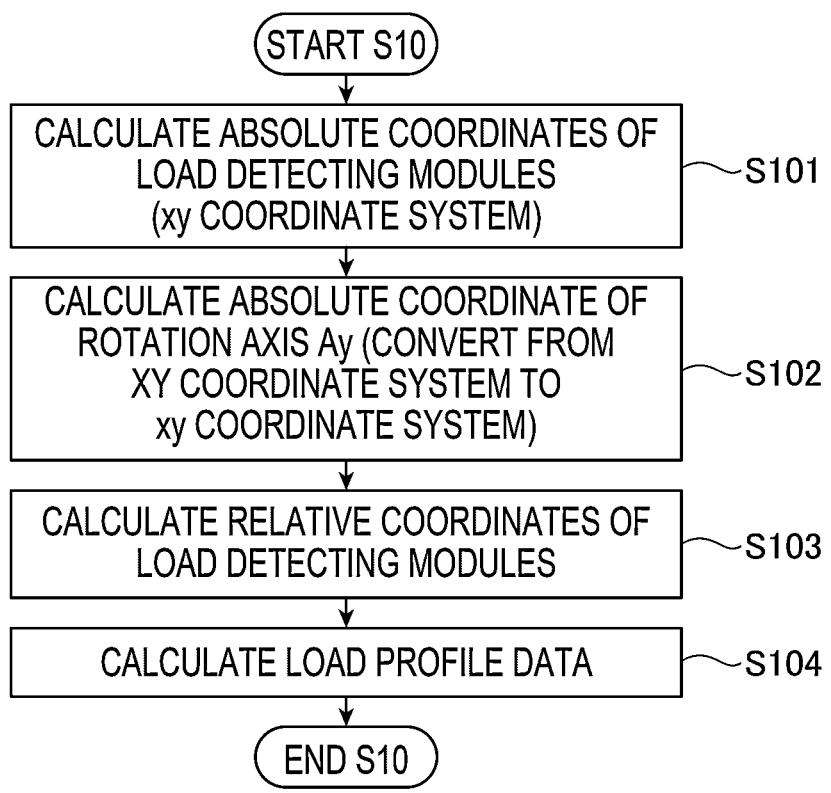
FIG. 24 is a flowchart showing a procedure for a load profile calculation.

FIG. 24 is a flowchart showing a procedure for the load profile calculation S10. The load profile calculation S10 is a process for calculating the load profile data based on measurement results obtained by the n measurement sets S5.

The load profile data is data in which values of three types of forces acting on a tire (i.e., the radial force $f_R$, the tangential force $f_T$ and the lateral force $f_L$) are associated with plane coordinates on the road surface.

In the load profile calculation S10, firstly, calculation of coordinates of respective load detecting modules 1650*m* (S101) is executed. In the present embodiment, a coordinate of a point at the center of the upper surface of the load detecting module 1650*m* is defined as the coordinate of the load detecting module 1650*m*.

Figure 25:
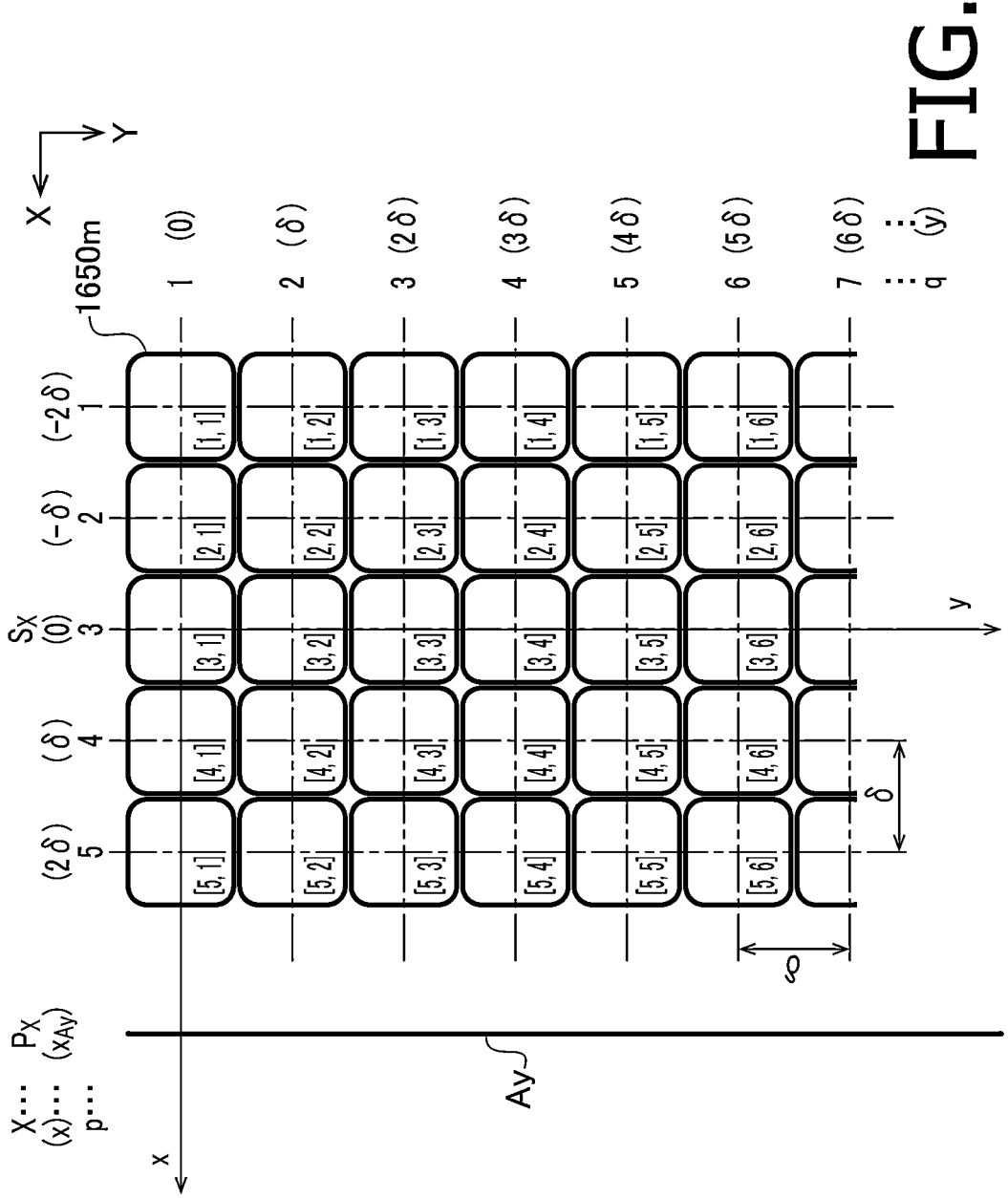
FIG. 25 is a plan view showing arrangement relationship between load detecting modules and a rotation axis of a test wheel.

FIG. 25 is a diagram showing positional relationship between the load detecting modules 1650*m* and the rotation axis Ay of the test wheel W. As described above, in the present embodiment, 150 load detecting modules are arranged in 5 rows in the X axis direction and 30 rows in the Y axis direction. In the following description, a number of row of the load detecting module 1650*m* in the X axis direction will be represented by p, a number of row of the load detecting module 1650*m* in the Y axis direction will be represented by q, and a position of the load detecting module 650*m* will be represented by a pair of positive integer [p, q] (hereinafter referred to as an address [p, q]).

In the load profile calculation S10, an (x, y) coordinate system is used. The (x, y) coordinate system is a two-dimensional orthogonal coordinate system parallel to an (X, Y) coordinate system, the origin of the (x, y) coordinate system being the center of the upper surface of the load detecting module 1650*m* positioned at the address [3, 1]. That is, the xy plane is a plane on which the road surface 63*a* and 1652*a* of the road surface part 60 is disposed. In the present embodiment, the origin of the (x, y) coordinate system (i.e., a position of the load detecting module 1650*m* at address [3, 1]) is defined as a position of the sensor array unit 1650. In the following description, a coordinate whose origin is a fixed point is referred to as an absolute coordinate, and a coordinate whose origin is a movable point is referred to as a relative coordinate. In the load profile calculation S10, the absolute coordinates of respective load detecting modules 1650*m* are calculated.

In the present embodiment, the load detecting modules 1650*m* are arranged at constant intervals δ in the x axis direction and the y axis direction. Therefore, the coordinates x and y of the address [p, q] are calculated in accordance with the following formulas.

$$x=(p-3)*\delta$$

$$y=(q-1)*\delta$$

Then, an x coordinate of the rotation axis Ay of the test wheel W (hereinafter referred to as a "coordinate $x_{Ay}$") is calculated (S102). The coordinate $x_{Ay}$ is calculated in accordance with the following formula.

$$x_{Ay}=P_X-S_X$$

where $P_X$: X coordinate of the travelling position Px of the test wheel W (the rotation axis Ay)

$S_X$: X coordinate of the origin of the (x, y) coordinate

That is, in the process S102, the coordinates of the rotation axis Ay of the test wheel W are converted from the XY coordinate system into the xy coordinate system.

Then, relative positions (relative coordinates) of the load detecting modules 1650*m* with respect to the travelling position Px of the test wheel W (the rotation axis Ay) are calculated (S103). Relative coordinates $(x_r, y_r)$ of the load detecting modules 1650*m* are calculated in accordance with the following formulas. In the present embodiment, a load profile data relating to the relative coordinate with respect to the rotation axis Ay is obtained.

$$x_r=x-x_{Ay}$$

$$y_r=y$$

Then, pieces of load profile data of three types of forces $f_R$, $f_T$ and $f_L$ are calculated by averaging all the measurement results (i.e., the radial forces $f_R$, the tangential forces $f_T$ and the lateral forces $f_L$ measured by respective load detecting modules 1650*m*) for every relative coordinate $(x_r, y_r)$ (S104). In the process S104, the pieces of load profile data may be calculated as proximate curved surfaces that can be obtained by regression analysis (e.g., curved surface fitting such as the least square method).

In the process S104, the pieces of load profile data may be calculated while taking into account the rotational position $\theta_W$ of the test wheel W (i.e., for each rotational position $\theta_W$). In this case, the pieces of load profile data may be calculated while further taking into account symmetric property of a tread pattern of the test tire T about the rotation axis Ay. Specifically, the pieces of load profile data may be calculated for all the rotational positions $\theta_W$ that are same in phase of a cycle of the tread pattern in the circumferential direction.

In the present embodiment, by the n measurement sets, measurements for only one rotation of the test wheel W is performed. However, the number of measurement sets may be increased to perform measurements for a plurality of rotations. In the present embodiment, since a plurality of measurement sets are performed while changing the rotational position $\theta_W$ of the test wheel W at the initial position $P_{X0}$ by the central angle $\delta_{C2}$ of the test wheel W corresponding to the arrangement interval $\delta$ of the load detecting modules 1650m, resolution of the load profile data in the x axis direction is nearly the size of the arrangement interval $\delta$ of the load detecting modules 1650m. By repeatedly performing the measurement set while changing the rotational position $\theta_W$ by a further smaller angle (e.g., 1/10 of the central angle $\theta_{C2}$), substantial resolution in the x axis direction can be made smaller than the arrangement interval $\delta$ of the load detecting modules 1650m. For example, if the measurement sets are repeated while changing the rotational position $\theta_W$ by 1/m of the central angle $\theta_{C2}$ (m being a natural number), the substantial resolution in the x axis direction can be fined up to nearly $\delta/m$.

In the present embodiment, the length Lx (FIG. 19) of the detecting area of the sensor array unit 1650 in the X axis direction is shorter than a length of the tire tread in the X axis direction. Therefore, the load distribution cannot be obtained for the entire tire tread only by causing the test wheel W to roll over the sensor array unit 1650 once.

Therefore, in the present embodiment, a method of measuring the load distribution on the tire tread in several separate measurements while shifting the rotational position $\theta_W$ of the test wheel W at the time the test wheel W rolls on the sensor array unit 1650 is adopted. By this method, it becomes possible to shorten the length of the detecting area of the sensor array unit 1650 in the X axis direction and reduce the number of load detecting modules 1650m necessary to measure the load distribution, and thus it is made possible to reduce costs necessary to manufacture and maintain the sensor array unit 1650.

By repeatedly performing the measurement set while changing a y axis position of the sensor array unit 1650 with the moving unit 1655 by a predetermined interval, substantial resolution in the y axis direction can be made smaller. In this case, a motor capable of controlling position (e.g., a servo motor or a step motor) is used as the servo motor 1655m of the moving unit 1655. For example, by repeatedly performing the measurement set while changing the y axis position of the sensor array unit 1650 by 1 mm, the substantial resolution in the y axis direction can be fined to nearly 1 mm.

Figure 26C:
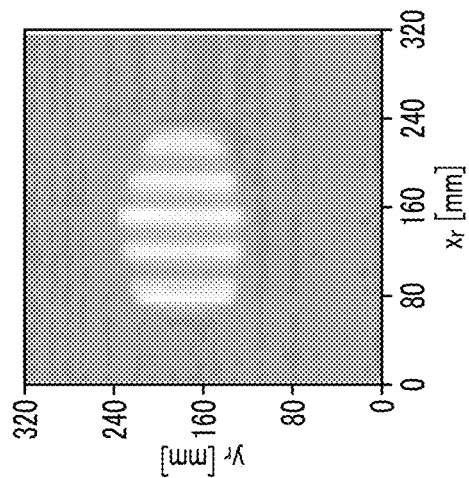
FIGS. 26A to 26C show display examples of load profiles.
Figure 26B:
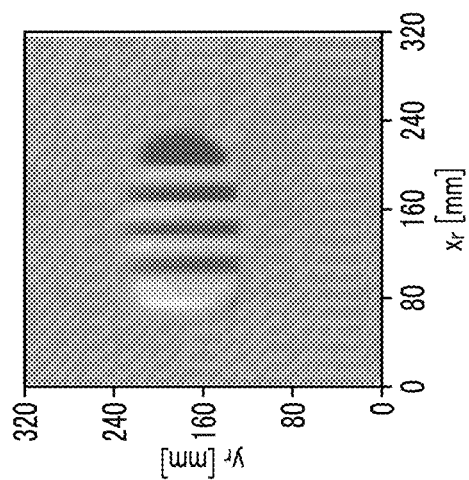
Figure 26A:
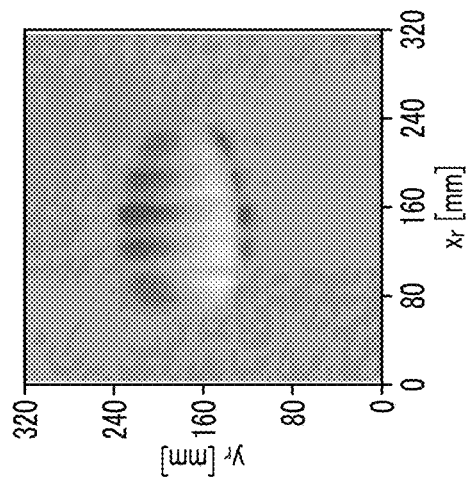

Then, a load profile images created based on the calculated load profile data are displayed on the display device of the interface part 76, thereby the load distribution acting on the tire tread surface is visualized (S11). FIGS. 26A to 26C show examples of displayed load profile images. FIG. 26A is a load profile image of the tangential forces $f_T$, FIG. 26B is a load profile image of the lateral forces $f_L$, and FIG. 26C is a load profile image of the radial forces $f_R$. The load profile images shown in FIGS. 26A to 26C are images generated by converting values of forces at respective positions ($x_r$, $y_r$) into brightness. The form of the load profile image is not limited to that of the present embodiment, and may be another form such as a three-dimensional CG image.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the above-described embodiment, the tire testing device 1 includes two belt mechanisms 50. However, the tire testing device 1 may include one belt mechanism 50 or three or more belt mechanisms 50.

In the above-described embodiment, the belt mechanisms 50 are driven by the power generated by the pair of drive parts 14. However, the belt mechanisms 50 may be configured to be driven by one drive part 14 or three or more drive parts 14.

In the above-described embodiments the toothed belt and the toothed pulleys are used in each of the belt mechanisms 50, 23, 24. However, a flat belt or a V belt may be used in place of the toothed belt in one or more belt mechanisms. Other type of winding transmission mechanism such as a chain transmission mechanism or a wire transmission mechanism and other type of power transmission mechanism such as a ball screw mechanism, a gear transmission mechanism or a hydraulic mechanism may be used in place of the belt mechanism.

In the above-described embodiment, the power for driving the carriage 20 and the power for driving the test wheel W (the spindle 280) are supplied from the common drive parts 14 and are transmitted through the common belt mechanisms 50. However, the present disclosure is not limited to this configuration. For example, the power for driving the carriage 20 and the power for driving the test wheel W may be generated by separate drive parts and may be transmitted through separate power transmission unit (e.g., separate belt mechanisms). In this case, driving of the drive part for driving the carriage and driving of the drive part for driving the test wheel needs to be synchronously controlled in order to synchronize the travelling speed of the carriage 20 and the peripheral speed of the test wheel W.

In the above-described embodiment, simple driving system and control system are realized by commonalizing a portion (the drive parts 14 and the drive belt mechanisms 50) of the mechanism for driving the carriage 20 (a carriage driving unit) and a portion (the drive parts 14 and the drive belt mechanisms 50) of the mechanism for driving the test wheel W (a test wheel driving unit). The commonalization of the carriage driving unit and the test wheel driving unit (especially the commonalization of the drive parts 14) is made possible due to reduction of load the drive parts 14 bear by the introduction of the torque applying device 30 to isolate a power source for controlling speed of the test wheel W from a power source for controlling torque of the test wheel W.

In the above-described embodiment, a configuration is adopted in which the drive parts 14RA and 14RB on the right function as both the carriage driving unit and the rotational motion supplying unit, and the drive parts 14LA and 14LB on the left function as the carriage driving unit. However, the present disclosure is not limited to this configuration. For example, a configuration may be adopted in which the drive parts 14LA and 14LB on the left serve as both the carriage driving unit and the rotational motion supplying unit, and the drive parts 14RA and 14RB on the right function as the carriage driving unit. Further, both of the drive parts 14LA and 14LB on the left and the drive parts 14RA and 14RB on the right may serve as the carriage driving unit and the rotational motion supplying unit. This configuration is realized, for example, by connecting two shafts 223B of the right and left driven parts 22R and 22L (in other words, by replacing the two shafts 223B of the right and left driven parts 22R and 22L with one long shaft 223B connecting the right and left driven parts 22R and 22L).

In the above-described third variation, it is made possible to measure the load profiles of a tire tread that is longer than the length Lx of the detecting area of the sensor array unit 1650 in the X axis direction by changing the rotational position $\theta_W$ of the test wheel W at the initial position $P_{Z0}$ for every measurement set. However, it becomes possible to measure the load profiles of a tire tread that is longer than the length Lx without changing the rotational position $\theta_W$ of the test wheel W at the initial position $P_{Z0}$ for every measurement set by providing a unit that makes it possible to change a position of the sensor array unit 1650 in the X axis direction. The unit that makes it possible to change the position of the sensor array unit 1650 in the X axis direction can for example be configured with a motor capable of controlling position and a feed screw mechanism (e.g., a ball screw mechanism) as with the moving unit 1655.

In the above-described embodiment, in the guide mechanism 13 of the track part 10, the rod 134a and the like are supported by the pair of single-row bearings 137a or the like. However, the present disclosure is not limited to this configuration. For example, the rod may be supported by one or more double-row or single-row bearings.

In the above-described embodiment, the heat-treated rail is used in the guide mechanism 13 of the track part 10. However, the present disclosure is not limited to this configuration. For example, a normal rail (JIS E 1101:2001) or a light rail (JIS E 1103:1993) may be used. Further, the rail is not limited to the flat-bottomed rail, and a rail having another shape such as a double-headed rail, a bull-headed rail, or a bridge-shaped rail may be used.

In the above-described embodiment, the servo motor 141 (AC servo motor) is used as the drive part 14. However, the present disclosure is not limited to this configuration. In place of the AC servo motor, another type of motor with which speed control or position control is possible (e.g., a DC servo motor or a so-called inverter motor in which an inverter circuit is combined with an AC motor or a brushless motor) may be used.

In the above-described embodiment, the servo motors 32, 451, and 461 which are AC servo motors are used in the torque applying device 30, the load adjusting part 45 and the slip angle adjusting part 46, respectively. However, the present disclosure is not limited to this configuration. In place of the AC servo motor, another type of motor with which position control is possible (e.g., a DC servo motor or a stepping motor) may be used.

What is claimed is:

1. A tire testing device comprising:
a road surface;
a carriage configured to rotatably hold a test wheel on which a test tire is mounted and capable of traveling along the road surface in a state where the test tire is in contact with the road surface; and
a plurality of guide mechanisms including a first guide mechanism and a second guide mechanism, which are configured to guide movement of the carriage in a traveling direction,
wherein each of the plurality of guide mechanisms includes:
a rail extending in the traveling direction of the carriage, the rail having a first side facing in a first direction and a second side facing in a second direction opposite the first direction; and
a runner fixed to the carriage and capable of travelling on the rail,
wherein the runner includes:
a plurality of rollers capable of rolling on the rail; and
a plurality of bearings configured to rotatably support the rollers,
wherein each bearing is a rolling bearing including rolling elements rolling on a circular track,
wherein the plurality of rollers include:
a first roller capable of rolling on an upper surface of a head of the rail; and
at least one of a second roller capable of rolling on a lower surface of the head of the rail and a third roller capable of rolling on a side surface of the head of the rail,
wherein the rail of the first guide mechanism and the rail of the second guide mechanism are arranged parallel to each other,
wherein, in the first guide mechanism, all of the rollers except for the first roller are disposed only on the first side of the rail of the first guide mechanism, and
wherein, in the second guide mechanism, all of the rollers except for the first roller are disposed only on the second side of the rail of the second guide mechanism.

2. The tire testing device according to claim 1,
wherein, in the first guide mechanism, all of the rollers except for the first roller are disposed on a side of the rail opposite to the second guide mechanism, and
wherein, in the second guide mechanism, all of the rollers except for the first roller are disposed on a side of the rail opposite to the first guide mechanism.

3. The tire testing device according to claim 1,
wherein, in the first guide mechanism, all of the rollers except for the first roller are disposed on a same side of the rail as the second guide mechanism, and
wherein, in the second guide mechanism, all of the rollers except for the first roller are disposed on a same side of the rail as the first guide mechanism.

4. The tire testing device according to claim 1,
wherein the plurality of rollers are grouped into a plurality of sets, and
wherein the plurality of sets of rollers are arranged in the traveling direction of the carriage, and
wherein each the plurality of sets of rollers includes the first roller and at least one of the second roller and the third roller.

5. The tire testing device according to claim 1,
wherein the runner includes:
a frame attached to the carriage; and
a plurality of rods supported by the frame, wherein each bearing includes:
- an inner ring fitted to a respective one of the rods;
- an outer ring fitted to an inner peripheral surface of a respective one of the rollers; and
- a plurality of the rolling elements interposed between an outer peripheral surface of the inner ring and an inner peripheral surface of the outer ring.

6. The tire testing device according to claim 1,
wherein the plurality of guide mechanisms include a third guide mechanism, and
wherein, in the third guide mechanism, all of the rollers except for the first roller are disposed only on the first side of the rail.

7. The tire testing device according to claim 6,
wherein the third guide mechanism is disposed between the first guide mechanism and the second guide mechanism.

8. The tire testing device according to claim 6,
wherein the second guide mechanism is disposed between the first guide mechanism and the third guide mechanism.

9. The tire testing device according to claim 1,
wherein the rail is a railway rail.

* * * * *